(12) United States Patent
Hong et al.

(10) Patent No.: US 9,986,616 B2
(45) Date of Patent: May 29, 2018

(54) LAMP CONTROL DEVICE

(71) Applicant: SILICON WORKS CO., LTD., Daejeon (KR)

(72) Inventors: Ju Pyo Hong, Daejeon (KR); Joo Wan Ha, Bucheon-si (KR); Hai Feng Jin, Daejeon (KR); Se Won Lee, Daejeon (KR); Wanyuan Qu, Daejeon (KR); Sung Hwan Kim, Yangsan-si (KR); Sun Geon Yoo, Cheongju-si (KR); Byeong Ho Jeong, Daejeon (KR); Ju Hyun Lee, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days. days.

(21) Appl. No.: 15/116,680

(22) PCT Filed: Dec. 30, 2015

(86) PCT No.: PCT/KR2015/014472
§ 371 (c)(1),
(2) Date: Aug. 4, 2016

(87) PCT Pub. No.: WO2016/108612
PCT Pub. Date: Jul. 7, 2016

(65) Prior Publication Data
US 2017/0303352 A1 Oct. 19, 2017

(30) Foreign Application Priority Data

Dec. 30, 2014 (KR) .................. 10-2014-0193969

(51) Int. Cl.
*H05B 33/08* (2006.01)
*B60Q 1/34* (2006.01)
*B60Q 1/44* (2006.01)

(52) U.S. Cl.
CPC ............ *H05B 33/089* (2013.01); *B60Q 1/34* (2013.01); *B60Q 1/44* (2013.01); *H05B 33/0827* (2013.01); *H05B 33/0851* (2013.01)

(58) Field of Classification Search
CPC ............ H05B 33/0827; H05B 33/0851; H05B 33/089; B60C 1/34; B60C 1/44
(Continued)

(56) References Cited

U.S. PATENT DOCUMENTS 9,185,769 B2 * 11/2015 Kim ..................... H05B 33/089
2004/0080273 A1 * 4/2004 Ito ....................... H05B 33/0815
315/77

(Continued)

FOREIGN PATENT DOCUMENTS

| KR | 10-2011-0017784 | 2/2011 |
| KR | 10-2012-0111341 | 10/2012 |
| KR | 10-2013-0063879 | 6/2013 |

OTHER PUBLICATIONS

International Search Report for International Application No. PCT/KR2015/014472, dated May 26, 2016.
Written Opinion with English Translation for International Application No. PCT/KR2015/014472, dated May 19, 2016.

*Primary Examiner* — Jason M Crawford
(74) *Attorney, Agent, or Firm* — Kile Park Reed & Houtteman PLLC

(57) ABSTRACT

A lamp control device includes a lamp including an LED module which has a plurality of LED channels; and a controller configured to detect respective feedback voltages of the plurality of LED channels, and determine, when at least any one feedback voltage among the feedback voltages is retained to be lower than a predetermined reference voltage and a generation count of an over voltage protection signal reaches a predetermined reference count, an LED channel corresponding to the feedback voltage, as an open.

9 Claims, 20 Drawing Sheets

(58) Field of Classification Search
USPC .................. 315/91, 291, 294, 297, 307, 312
See application file for complete search history.

(56) References Cited

U.S. PATENT DOCUMENTS

| | | | |
|---|---|---|---|
| 2005/0269968 A1* | 12/2005 | Ito | H05B 33/0815 315/282 |
| 2007/0114951 A1* | 5/2007 | Tsen | H05B 33/0818 315/291 |
| 2008/0144236 A1* | 6/2008 | Chiang | H05B 33/0815 361/18 |
| 2011/0037407 A1* | 2/2011 | Ahn | H05B 33/0827 315/287 |
| 2011/0043114 A1* | 2/2011 | Hsu | H05B 33/0815 315/119 |
| 2013/0016310 A1* | 1/2013 | Kanemitsu | H05B 33/0818 349/69 |
| 2013/0082603 A1 | 4/2013 | Hsu et al. | |
| 2013/0140990 A1* | 6/2013 | Campos | H05B 33/0827 315/120 |
| 2014/0055439 A1* | 2/2014 | Lee | H05B 37/036 345/212 |
| 2014/0152180 A1* | 6/2014 | Wolf | H05B 33/0884 315/122 |
| 2016/0050732 A1* | 2/2016 | Lin | H05B 33/089 315/121 |
| 2016/0064925 A1* | 3/2016 | Zhang | G09G 3/3426 315/192 |

\* cited by examiner

FIG. 8

| ADDRESS | MEMORY VALUE | | | | | | | |
|---|---|---|---|---|---|---|---|---|
| 00 | LED CHANNEL BRIGHTNESS SETTING | | | | | | | |
| 01 | LED CHANNEL BRIGHTNESS SETTING | | | | | | | |
| 02 | LED CHANNEL BRIGHTNESS SETTING | | | | | | | |
| 03 | LED CHANNEL BRIGHTNESS SETTING | | | | | | | |
| 04 | LED CHANNEL BRIGHTNESS SETTING | | | | | | | |
| 05 | SET1 | SET2 | VREF1<3> | VREF1<2> | VREF1<1> | VREF1<0> | VREF2<3> | VREF2<2> |
| 06 | VREF2<1> | VREF2<0> | SET3 | SET4 | SET5 | OSC<2> | OSC<1> | OSC<0> |
| 07 | ETC1 | ETC2 | ETC3 | ETC4 | ETC5 | ETC6 | ETC7 | ETC8 |

FIG. 10

| SET_OPTS | DIM | ACTION |
|---|---|---|
| L | L | TAIL |
| L | H | STOP |
| H | L | SEQUENTIAL/FLICKERING |
| H | H | FLICKERING(ESS: EMERGENCY STOP) |

LAMP CONTROL DEVICE

BACKGROUND

1. Technical Field

The present disclosure relates to a lamp control device, and more particularly, to a lamp control device for a vehicle, with improved stability and functionality.

2. Related Art

In general, an automobile includes vehicle lamps for various uses. The vehicle lamps may include a head lamp and a rear combination lamp.

Among the vehicle lamps, a rear combination lamp includes a turn signal lamp, a stop lamp, a tail lamp and a back-up lamp, and is used as means for informing the driving intention and driving state of a vehicle to drivers of other vehicles.

Recently, with the rapid development of a high brightness LED (light emitting diode), vehicle lamps adopting LEDs are being developed. Vehicle lamps adopting LEDs as light sources are diversified in their designs, and the numbers of LEDs used therein are being increased.

However, an LED driving device for driving LEDs has limitations in increasing the number of parts for controlling light emission of LEDs, in proportion to an increase in the number of LEDs, and in regularly disposing LEDs in conformity with the installation circumstances of a vehicle. Due to this fact, differences in the intensity of light may be caused by positions.

Among conventional vehicle lamps, a turn signal lamp is used to be flickered when making a turn during driving and thereby indicate a direction in which the turn is to be made, to other vehicles. The turn signal lamp needs to be improved to be capable of driving LEDs in such a way as to render an esthetically appealing appearance, and to have additional functionality.

A conventional lamp control device drives a vehicle lamp by using an FET or a BJT and an OP-AMP. Also, the conventional lamp control device additionally uses a pulse width modulation generator, a voltage regulator, and so forth, for dimming.

In the conventional lamp control device, a limitation may be caused in increasing the number of LED channels due to the installation circumstances of a vehicle, and an error may be caused in the offset between parts, arrangement of parts, etc.

Such an offset between parts may induce a current deviation between LED channels. Attributable to the current deviation, a problem may be caused in the conventional lamp control device in that it is difficult to implement uniform brightness control between channels.

Further, in the case where a certain LED channel is open or shorted among a plurality of LED channels included in a vehicle lamp, problems such as power efficiency degradation and heat generation may be caused.

For instance, in the case where a certain LED channel is open among a plurality of LED channels included in a vehicle lamp, as the feedback voltage of the corresponding LED channel is lowered, an influence cannot help but be exerted on the output voltage (VOUT) regulation of a converter. Due to this fact, power efficiency degradation may occur, and heat generation may increase as the temperature of an FET/BJT corresponding to a normal LED channel rises.

Moreover, in the case where a certain LED channel is shorted among a plurality of LED channels included in a vehicle lamp, as the feedback voltage of the corresponding LED channel is raised, heat generation may increase as the temperature of an FET/BJT corresponding to the shorted LED channel rises.

Because a rear combination lamp among vehicle lamps is installed on a rear portion of a vehicle body, it is difficult for a driver to frequently check whether the rear combination lamp operates normally. If an LED adopted in a vehicle lamp does not operate normally, an accident may occur during driving since the driving intention of a vehicle cannot be appropriately indicated to trailing vehicles.

Therefore, a technology of precisely monitoring the mis-operation of an LED channel adopted in a vehicle lamp, performing a protection operation for the mis-operating LED channel and preventing an adverse influence by the mis-operating LED channel is keenly demanded in the art.

SUMMARY

Various embodiments are directed to a lamp control device capable of stably driving a vehicle lamp which adopts LEDs.

Various embodiments are directed to a lamp control device capable of improving an aesthetic appearance of a vehicle by sequentially turning on LED channels of a vehicle lamp through counting of a predetermined delay time.

Various embodiments are directed to a lamp control device which has functionality capable of converting a lamp having a turn signaling function into a lamp having the function of an emergency lamp in correspondence to a sudden stop of a vehicle.

Various embodiments are directed to a lamp control device capable of adopting a plurality of LED channels in a lamp and stably performing independent dimming control for the channels.

Various embodiments are directed to a lamp control device capable of performing independent dimming control over a plurality of LED channels by using memory values and easily setting memory values.

Various embodiments are directed to a lamp control device capable of easily regulating the respective channel currents or the total channel current of a plurality of LED channels.

Various embodiments are directed to a lamp control device capable of precisely monitoring a mis-operation of a vehicle lamp which adopts LEDs, and a monitoring method thereof.

Various embodiments are directed to a lamp control device capable of performing a protection operation for a mis-operating LED channel and thereby preventing occurrence of a vehicle accident and improving driving stability, and a monitoring method thereof.

In an embodiment, a lamp control device may include: a lamp including an LED module which has a plurality of LED channels; and a controller configured to detect respective feedback voltages of the plurality of LED channels, and determine, when at least any one feedback voltage among the feedback voltages is retained to be lower than a predetermined reference voltage and a generation count of an over voltage protection signal reaches a predetermined reference count, an LED channel corresponding to the feedback voltage, as an open.

In an embodiment, a method for monitoring a lamp control device may include: detecting respective feedback voltages of a plurality of LED channels; checking whether an over voltage protection signal is generated, when at least any one feedback voltage among the feedback voltages is lower than a predetermined reference voltage; and determining an LED channel corresponding to the feedback voltage, as an open, when a generation count of the over voltage protection signal reaches a predetermined reference count.

In an embodiment, a lamp control device may include: a lamp including an LED module which has a plurality of LED channels; and a controller configured to detect respective feedback voltages of the plurality of LED channels, and determine, when at least any one feedback voltage among the feedback voltages is retained to be higher than a predetermined reference voltage and is continuously retained for a predetermined time, an LED channel corresponding to the feedback voltage, as a short.

In an embodiment, a method for monitoring a lamp control device may include: detecting respective feedback voltages of a plurality of LED channels; increasing a count when at least any one feedback voltage among the feedback voltages is higher than a predetermined reference voltage; and determining an LED channel corresponding to the feedback voltage, as a short, when the count reaches a predetermined reference count.

According to the embodiments, even though the number of LED channels adopted in a vehicle lamp is increased, it is possible to stably drive an LED module.

According to the embodiments, the aesthetic appearance of a vehicle may be improved by sequentially turning on a plurality of LED channels adopted in the turn signal lamp of the vehicle through counting of a predetermined delay time.

According to the embodiments, occurrence of a vehicle accident may be prevented and driving stability may be improved by automatically converting a lamp having a turn signaling function into a lamp having the function of an emergency lamp in correspondence to a sudden stop of a vehicle.

According to the embodiments, even though a number of LED channels are adopted in a vehicle lamp, independent dimming control may be stably performed for the respective channels.

According to the embodiments, memory values for independent dimming control for a plurality of LED channels may be easily set.

According to the embodiments, the respective channel currents or the total channel current of a plurality of LED channels may be easily regulated.

According to the embodiments, it is possible to precisely monitor an open or a short of a vehicle lamp which adopts LEDs.

According to the embodiments, occurrence of a vehicle accident may be prevented and driving stability may be improved by excluding an LED channel determined as an open or a short, from regulation of an output voltage, or controlling a duty.

BRIEF DESCRIPTION OF THE DRAWINGS

FIG. 8 is a diagram illustrating a representation of an example of a memory map set in the controller 20 of FIG. 7.

FIG. 10 is a diagram illustrating a representation of an example of a set option to be set in the controller of FIG. 7.

DETAILED DESCRIPTION

Figure 1:
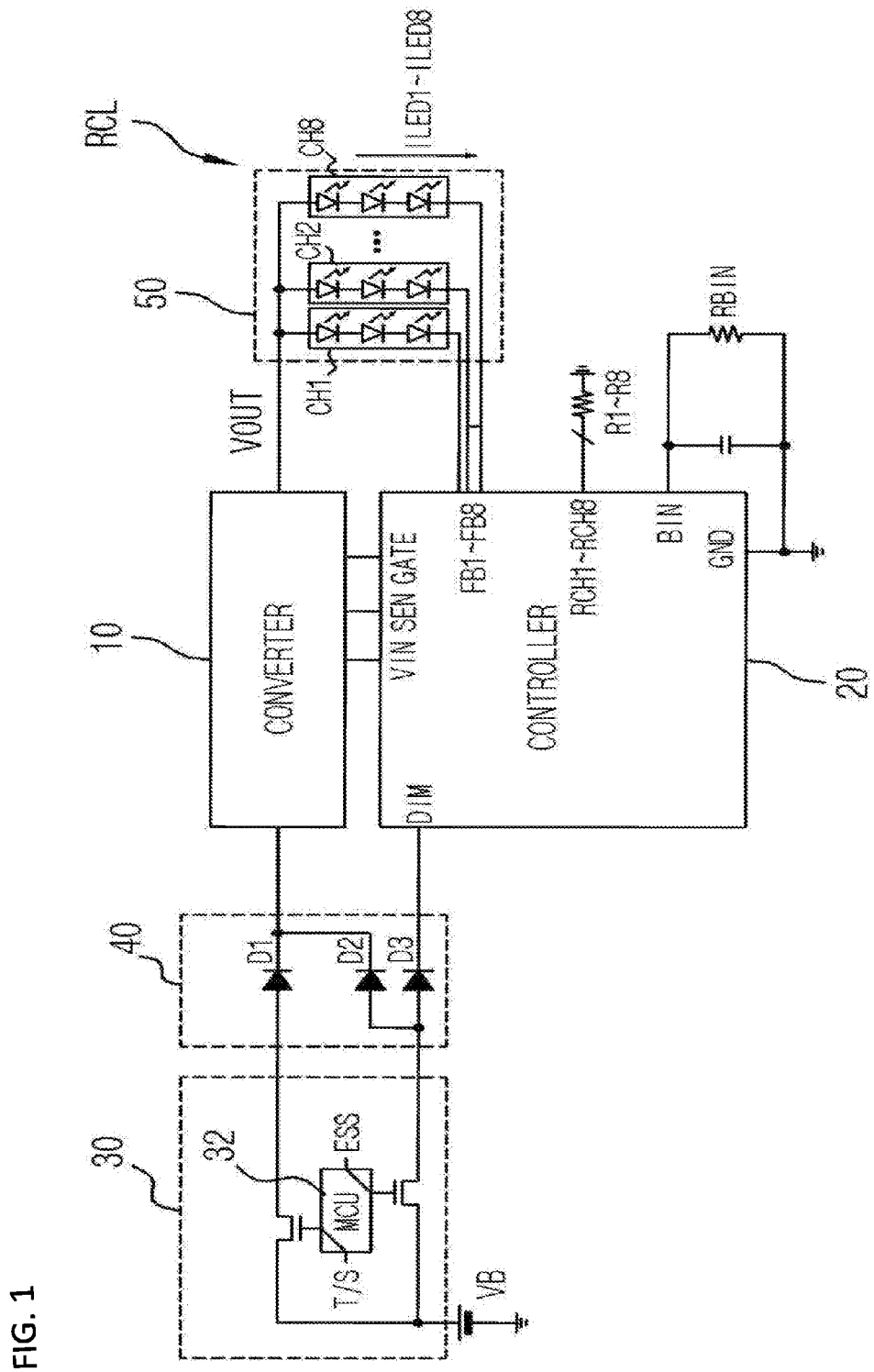
FIG. 1 is a representation of an example of a diagram to assist in the explanation of a lamp control device in accordance with a first embodiment of the present disclosure.

Hereinafter, embodiments of the present disclosure will be described in detail with reference to the accompanying drawings. The terms used herein and in the claims shall not be construed by being limited to general or dictionary meanings and shall be interpreted based on the meanings and concepts corresponding to technical aspects of the present disclosure.

Embodiments described herein and configurations illustrated in the drawings are preferred embodiments of the present disclosure, and, because they do not represent all of the technical features of the present disclosure, there may be various equivalents and modifications that can be made thereto at the time of the present application.

FIG. 1 is a representation of an example of a diagram to assist in the explanation of a lamp control device in accordance with a first embodiment of the present disclosure.

Referring to FIG. 1, the lamp control device according to the first embodiment includes a lamp RCL, a converter 10 and a controller 20.

The lamp RCL includes one LED module 50 which has a plurality of LED channels. The plurality of LED channels in the LED module 50 may be configured in parallel. The first embodiment illustrated in FIG. 1 exemplifies that one controller 20 drives the LEDs of first to eighth channels CH1 to CH8 of the LED module 50. For instance, the lamp RCL includes a stop lamp, a tail lamp, a turn signal lamp and an emergency stop lamp of a vehicle, or is a rear combination lamp which may compositely realize the function of informing a stop, a turn and a sudden stop of the vehicle. The lamp RCL may be divided, depending upon a kind of a vehicle, into a type in which the ramp RCL is installed on only a vehicle body and a type in which the lamp RCL is divisionally installed on a vehicle body and a trunk. Without a limiting sense, the first embodiment may be applied to the type in which the lamp RCL is installed on only a vehicle body.

A vehicle control unit 30 includes an MCU (micro control unit) 32, and controls a battery voltage VB to be transferred to the converter 10 in correspondence to a turn signal T/S. Between the vehicle control unit 30 and the converter 10 and the controller 20, there may be disposed a path unit 40 including a path in which the battery voltage VB is transferred and a path in which a dim signal DIM is transferred. The path unit 40 transfers the battery voltage VB outputted from the vehicle control unit 30, to the converter 10, and transfers the dim signal DIM to the controller 20.

The converter 10 generates an output voltage VOUT and an internal voltage VIN by using the battery voltage VB supplied from the vehicle control unit 30 in correspondence to the turn signal T/S, and supplies the output voltage VOUT to the LED module 50 and supplies the internal voltage VIN to the controller 20. For instance, as the converter 10, a buck converter may be used.

The controller 20 starts counting of a predetermined delay time T1 when the internal voltage VIN is supplied from the converter 10, and sequentially turns on the first to eighth channels CH1 to CH8 of the LED module 50 each time the counting of the delay time T1 is completed. In this regard, the controller 20 may be set to start the counting when the internal voltage VIN reaches a predetermined target level. The delay time T1 may be set to be equal to or longer than a time in which the sequential turn-on of the LED module 50 by the unit of channel may be perceived by a human's eyes.

The controller 20 may be configured to include switching elements (not shown) which form or block current paths between feedback voltage terminals FB1 to FB8 and channel resistor terminals RCH1 to RCH8 of the first to eighth channels CH1 to CH8. These switching elements are sequentially turned on each time the predetermined delay time T1 is counted and form the current paths between the feedback voltage terminals FB1 to FB8 and the channel resistor terminals RCH1 to RCH8, such that the first to eighth channels CH1 to CH8 of the LED module 50 are sequentially turned on.

That is to say, if the turn signal T/S is enabled, the controller 20 counts the predetermined delay time T1 and thereby controls the first to eighth channels CH1 to CH8 to be sequentially turned on with the interval of the delay time T1. The sequential turn-on may be understood as that the number of channels which are turned on and emit light is gradually increased.

In FIG. 1, VIN is the internal voltage for the operation of the controller 20, SEN is a sensing voltage which is used in level determination and counting synchronization of the internal voltage VIN, and GATE is a control signal for regulation of the output voltage VOUT. GATE may be provided as a PWM (pulse width modulation) signal.

In the lamp control device according to the present embodiment, configured as mentioned above, as the battery voltage VB is transferred to the converter 10 in correspondence to the turn signal T/S, the converter 10 supplies the internal voltage VIN to the controller 20 and supplies the output voltage VOUT to the LED module 50.

Then, the controller 20 repetitively performs counting by the unit of the predetermined delay time T1 from a time when the internal voltage VIN reaches the target level, and sequentially turns on the first to eighth channels CH1 to CH8 with the interval of the delay time T1. In other words, in the present embodiment, the lamp RCL having a turn signaling function is sequentially turned on by the unit of channel so that drivers of other vehicles may perceive the turn to be made.

While it is illustrated in the present embodiment that the first to eighth channels CH1 to CH8 of the LED module 50 are sequentially turned on with the interval of the delay time T1 after passage of the delay time T1, this is nothing but an illustration purpose only and it is to be noted that delay times T1 between respective channels may be set to be different partially or entirely.

Meanwhile, referring to FIG. 1, the MCU 32 of the vehicle control unit 30 controls the battery voltage VB to be transferred to the converter 10 in correspondence to an emergency stop signal ESS. The battery voltage VB is transferred to the converter 10 when not only the turn signal T/S but also the emergency stop signal ESS are enabled.

The emergency stop signal ESS is a signal which is enabled when suddenly stopping a vehicle.

The controller 20 receives the dim signal DIM, and selectively controls the first to eighth channels CH1 to CH8 to be sequentially turned on or be simultaneously flickered in correspondence to the state of the dim signal DIM. When the dim signal DIM is enabled in correspondence to the emergency stop signal ESS, the controller 20 repetitively turns on and off the switching elements which form the current paths between the feedback voltage terminals FB1 to FB8 and the channel resistor terminals RCH1 to RCH8, and thereby, controls the first to eighth channels CH1 to CH8 of the LED module 50 to be simultaneously flickered. A flickering cycle may be set in advance in the controller 20.

In other words, in the present embodiment, if the dim signal DIM is disabled with the internal voltage VIN supplied, the lamp RCL is sequentially turned on to indicate a turn to be made, and, if the dim signal DIM is enabled with the internal voltage VIN supplied, the lamp RCL is flickered to indicate an emergency situation.

Figure 2:
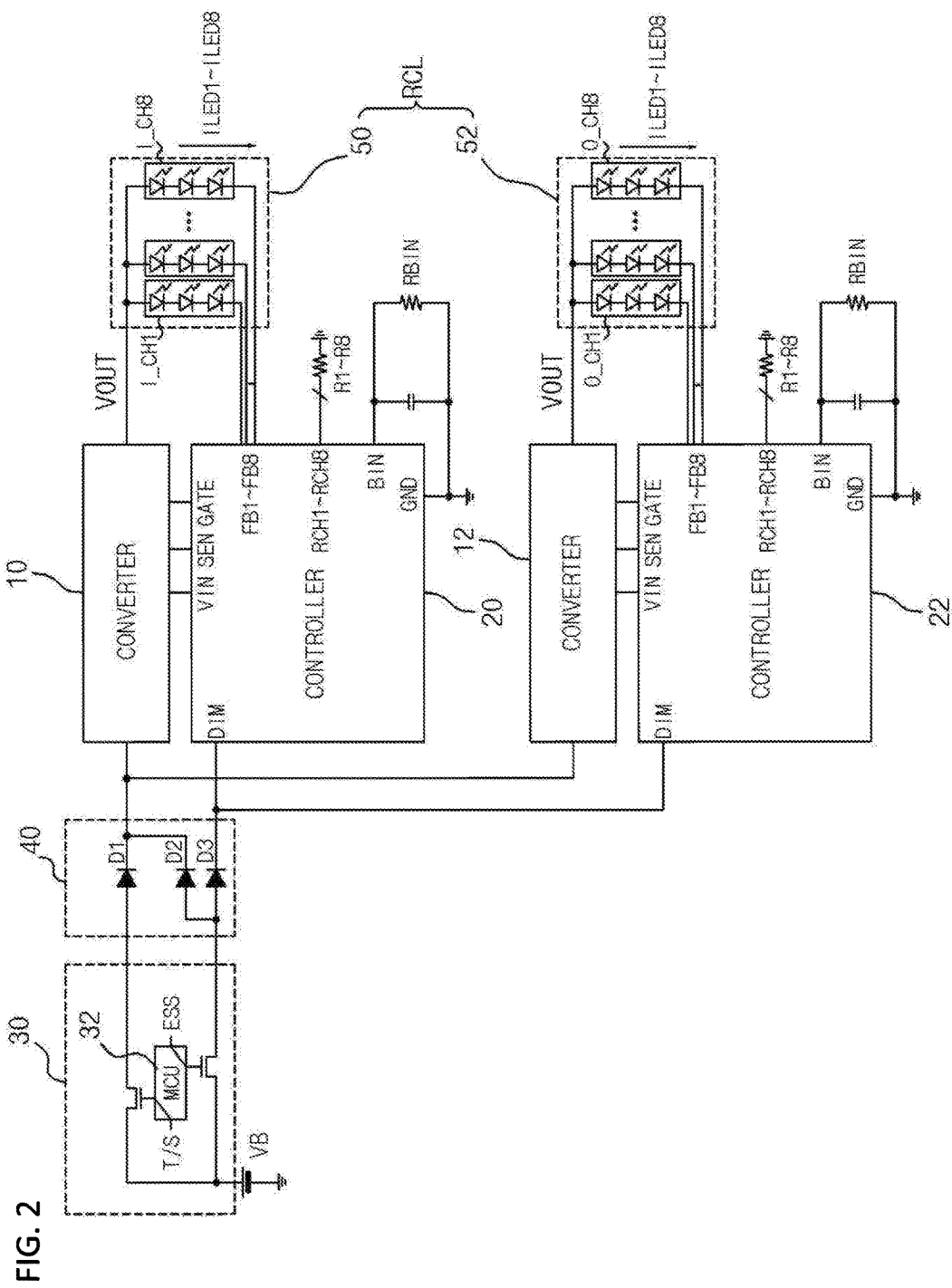
FIG. 2 is a representation of an example of a diagram to assist in the explanation of a lamp control device in accordance with a second embodiment of the present disclosure.
Figure 3:
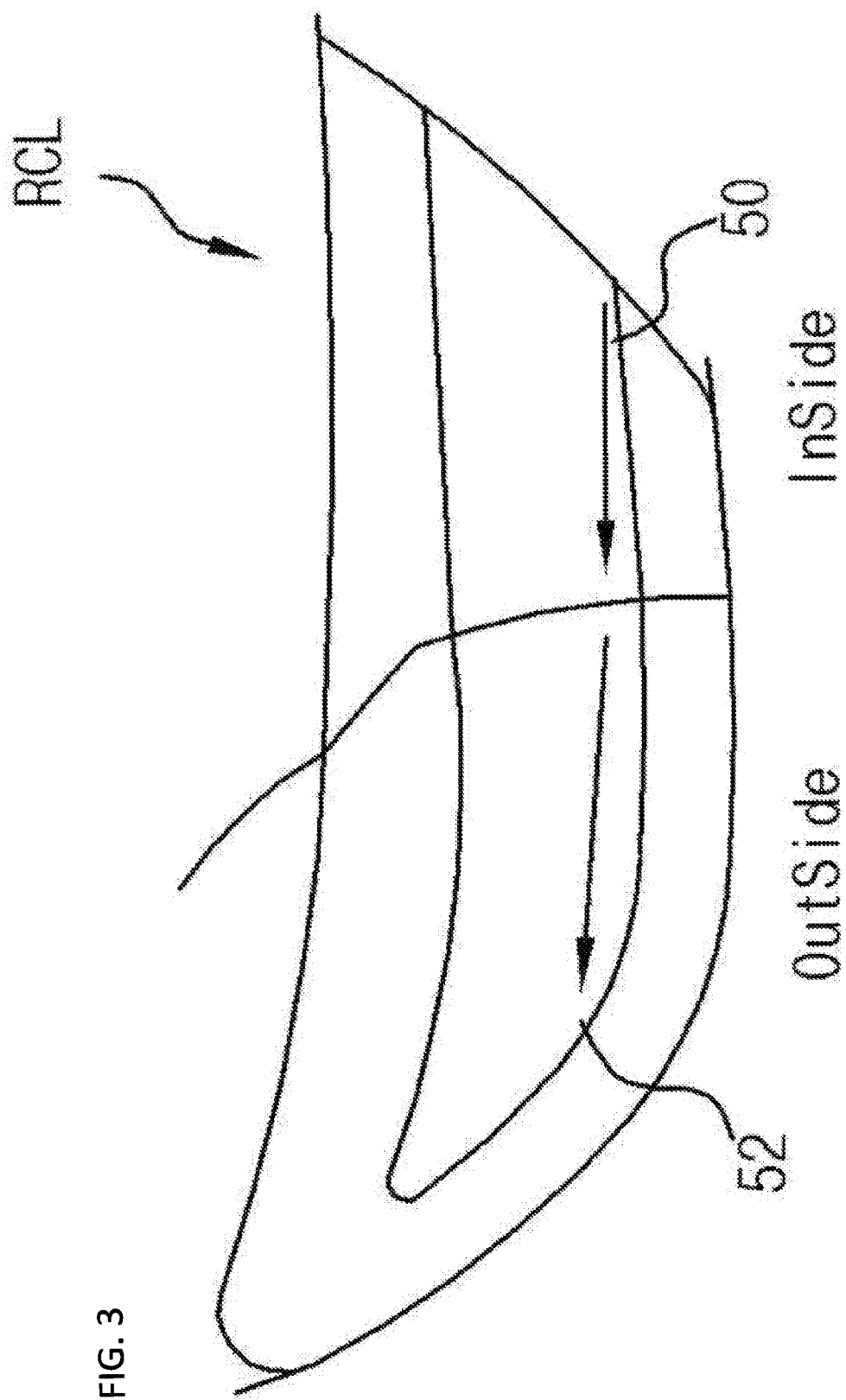
FIG. 3 is a diagram illustrating a representation of an example of a turn signal lamp to which the lamp control device of FIG. 2 is applied.

FIG. 2 is a representation of an example of a diagram to assist in the explanation of a lamp control device in accordance with a second embodiment of the present disclosure, and FIG. 3 is a diagram illustrating a representation of an example of a turn signal lamp to which the lamp control device of FIG. 2 is applied.

Referring to FIG. 2, the lamp control device according to the second embodiment includes a lamp RCL, converters 10 and 12, and controllers 20 and 22.

The lamp RCL includes an LED module 50 and an LED module 52 each of which has a plurality of LED channels. The second embodiment exemplifies that the controller 20 drives the LEDs of first to eighth channels I_CH1 to I_CH8 of the LED module 50 and the controller 22 drives the LEDs of first to eighth channels O_CH1 to O_CH8 of the LED module 52. The lamp RCL may be divided, depending upon a kind of a vehicle, into a type in which the ramp RCL is installed on only a vehicle body and a type in which the lamp RCL is divisionally installed on a vehicle body and a trunk.

The second embodiment may be applied to the type in which the lamp RCL is divisionally installed on a vehicle body and a trunk as shown in FIG. 3. Also, the second embodiment may be applied to the lamp RCL which needs a number of LEDs and thus adopts a plurality of LED modules. Of course, it is to be noted that the present disclosure is not limited thereto. In FIG. 3, the LED module 50 may correspond to an inside corresponding to the trunk of a vehicle, and the LED module 52 may correspond to an outside corresponding to the body of the vehicle.

Referring to FIG. 2, the converters 10 and 12 generate output voltages VOUT and internal voltages VIN by using a battery voltage VB transferred thereto in correspondence to a turn signal T/S, and supply the output voltages VOUT to the LED modules 50 and 52 and supply the internal voltages VIN to the controllers 20 and 22. While two converters 10 and 12 are used in the present embodiment, it is to be noted that one converter may be used.

The controller 20 starts counting of a predetermined first delay time T1 when the internal voltage VIN is supplied from the converter 10, and sequentially turns on the first to eighth channels I_CH1 to I_CH8 of the LED module 50 with the interval of the first delay time T1. The controller 22 starts counting of a predetermined second delay time T2 at the same point of time as the controller 20, and sequentially turns on the first to eighth channels O_CH1 to O_CH8 of the LED module 52 with the interval of the first delay time T1 after the counting of the second delay time T2 is completed. This will be described below in detail.

Figure 6:
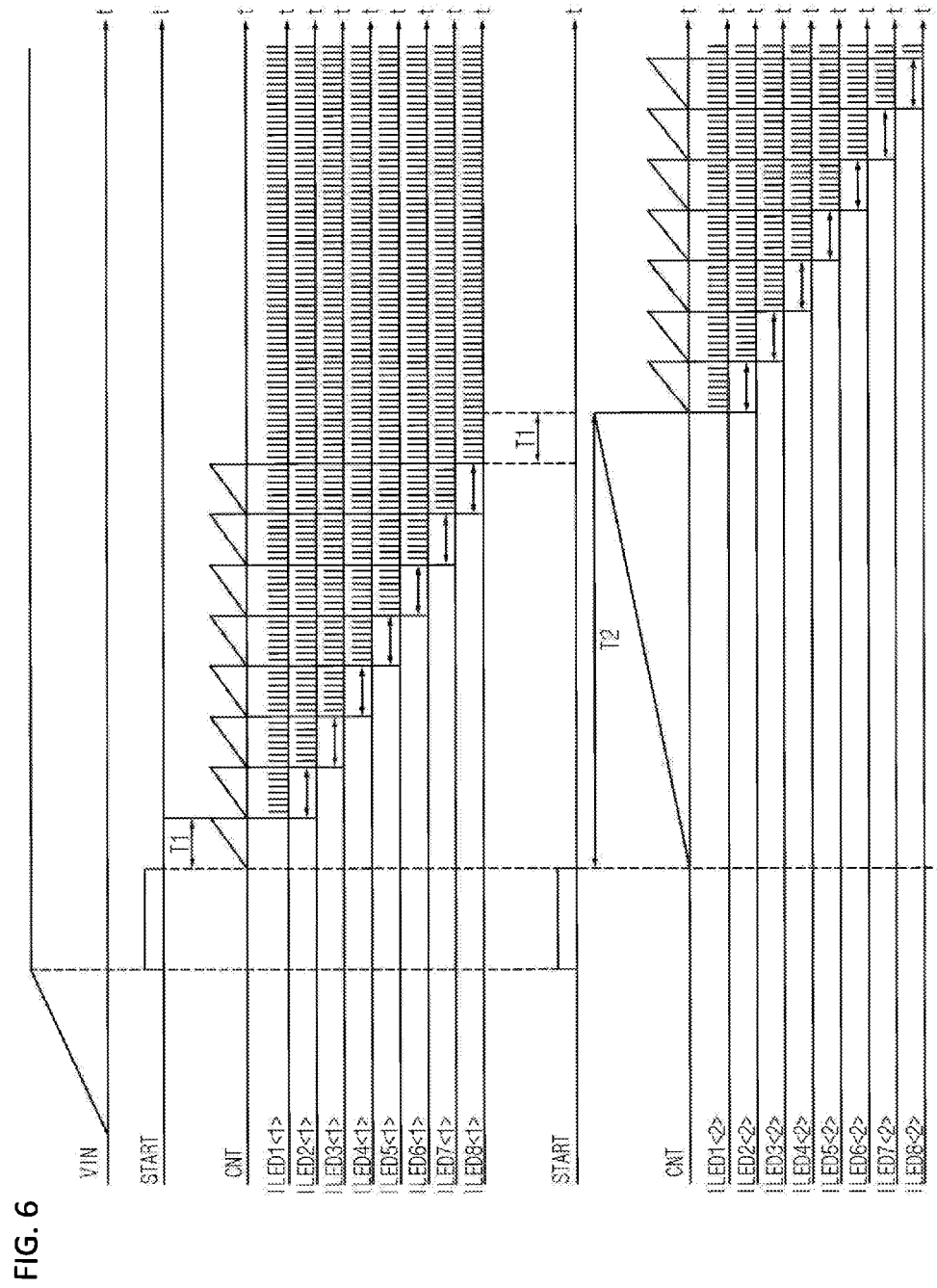
FIG. 6 is a representation of an example of a timing diagram to assist in the explanation of a method for controlling the lamp control device in accordance with the second embodiment of the present disclosure.

Referring to FIGS. 2 and 6, the controller 20 starts counting of the first delay time T1 when the internal voltage VIN reaches a predetermined target level. The controller 20 turns on the first channel I_CH1 when counting of the first delay time T1 is completed. In this way, each time counting of the first delay time T1 is completed, the controller 20 sequentially turns on the second to eighth channels I_CH2 to I_CH8 of the LED module 50 with the interval of the first delay time T1.

The controller 22 starts counting of the second delay time T2 at the same point of time as the controller 20, that is, at a point of time when the internal voltage VIN reaches the target level. The controller 22 turns on the first channel O_CH1 when counting of the second delay time T2 is completed, and starts counting of the first delay time T1. Each time counting of the first delay time T1 is completed, the controller 22 sequentially turns on the second to eighth channels O_CH2 to O_CH8 of the LED module 52 with the interval of the first delay time T1.

Herein, the second delay time T2 may be set to a time until the first delay time T1 passes after all the first to eighth channels I_CH1 to I_CH8 of the LED module 50 which are driven by the controller 20 are sequentially turned on.

Namely, the controller 20 and the controller 22 start counting of the first delay time T1 and the second delay time T2, respectively, at the same point of time when the internal voltage VIN reaches the target level. Then, when the first delay time T1 passes, the controller 20 sequentially turns on the first to eighth channels I_CH1 to I_CH8 of the LED module 50 with the interval of the first delay time T1, and, when the second delay time T2 passes, the controller 22 sequentially turns on the first to eighth channels O_CH1 to O_CH8 of the LED module 52 with the interval of the first delay time T1.

Resultantly, after the first to eighth channels I_CH1 to I_CH8 of the LED module 50 are sequentially turned on, the first to eighth channels O_CH1 to O_CH8 of the LED module 52 are sequentially turned on.

In this way, in the present embodiment, the controller 20 and the controller 22 do not drive the LED modules 50 and 52 by intercommunication or carry signals, but independently drive the LED modules 50 and 52 by using memory values.

In the present embodiment, the first and second delay times T1 and T2 may be stored in the memories (not shown) built in the controllers 20 and 22, and the controllers 20 and 22 may independently drive the LED modules 50 and 52 in synchronization with that the internal voltages VIN reach the predetermined target level. For instance, the memories may be configured by nonvolatile memories.

Hence, in the present embodiment, the controller 20 and the controller 22 independently start counting from the same point of time when the internal voltages VIN reach the target level, and perform control tasks in such a manner that the first to eighth channels O_CH1 to O_CH8 of the LED module 52 are sequentially turned on after the first to eighth channels I_CH1 to I_CH8 of the LED module 50 are sequentially turned on. Therefore, in the present embodiment, even though the number of LEDs used in the lamp RCL is increased, it is possible to stably drive the plurality of LED modules 50 and 52.

The controller 20 and the controller 22 receive a dim signal DIM, and selectively control the first to eighth channels I_CH1 to I_CH8 and O_CH1 to O_CH8 to be sequentially turned on or be simultaneously flickered in correspondence to the state of the dim signal DIM.

The controller 20 and the controller 22 sequentially turn on the first to eighth channels I_CH1 to I_CH8 and O_CH1 to O_CH8 when the internal voltages VIN are supplied with the dim signal DIM disabled. The controller 20 and the controller 22 simultaneously flicker the LED modules 50 and 52 when the dim signal DIM is enabled.

That is to say, in the present embodiment, if the dim signal DIM corresponding to an emergency stop signal ESS is enabled, by simultaneously flickering the LED modules 50 and 52, the lamp RCL of a turn signaling function may be converted into the function of an emergency lamp.

Figure 4:
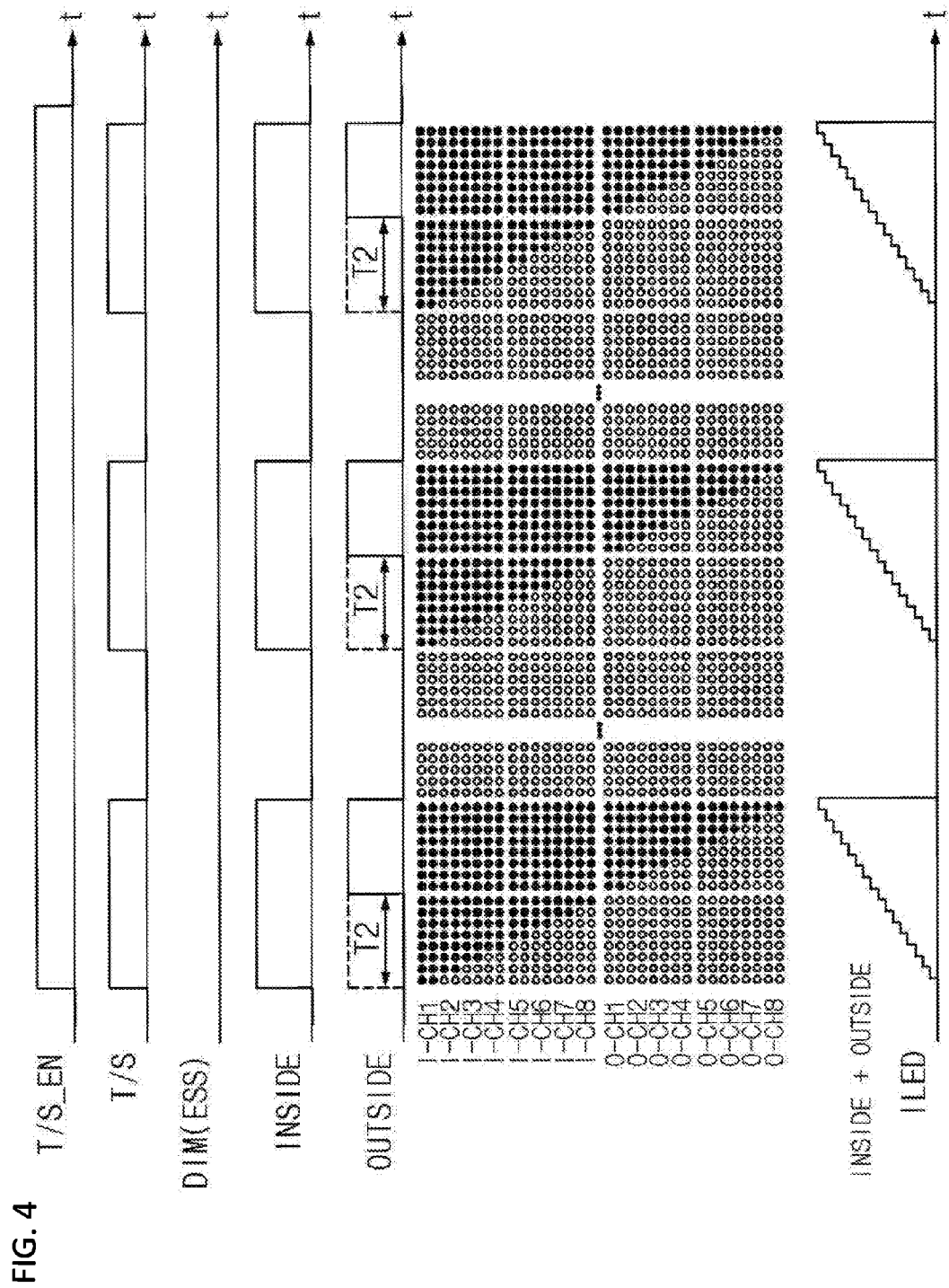
FIGS. 4 and 5 are representations of examples of waveform diagrams to assist in the explanation of an operation process in FIG. 2.
Figure 5:
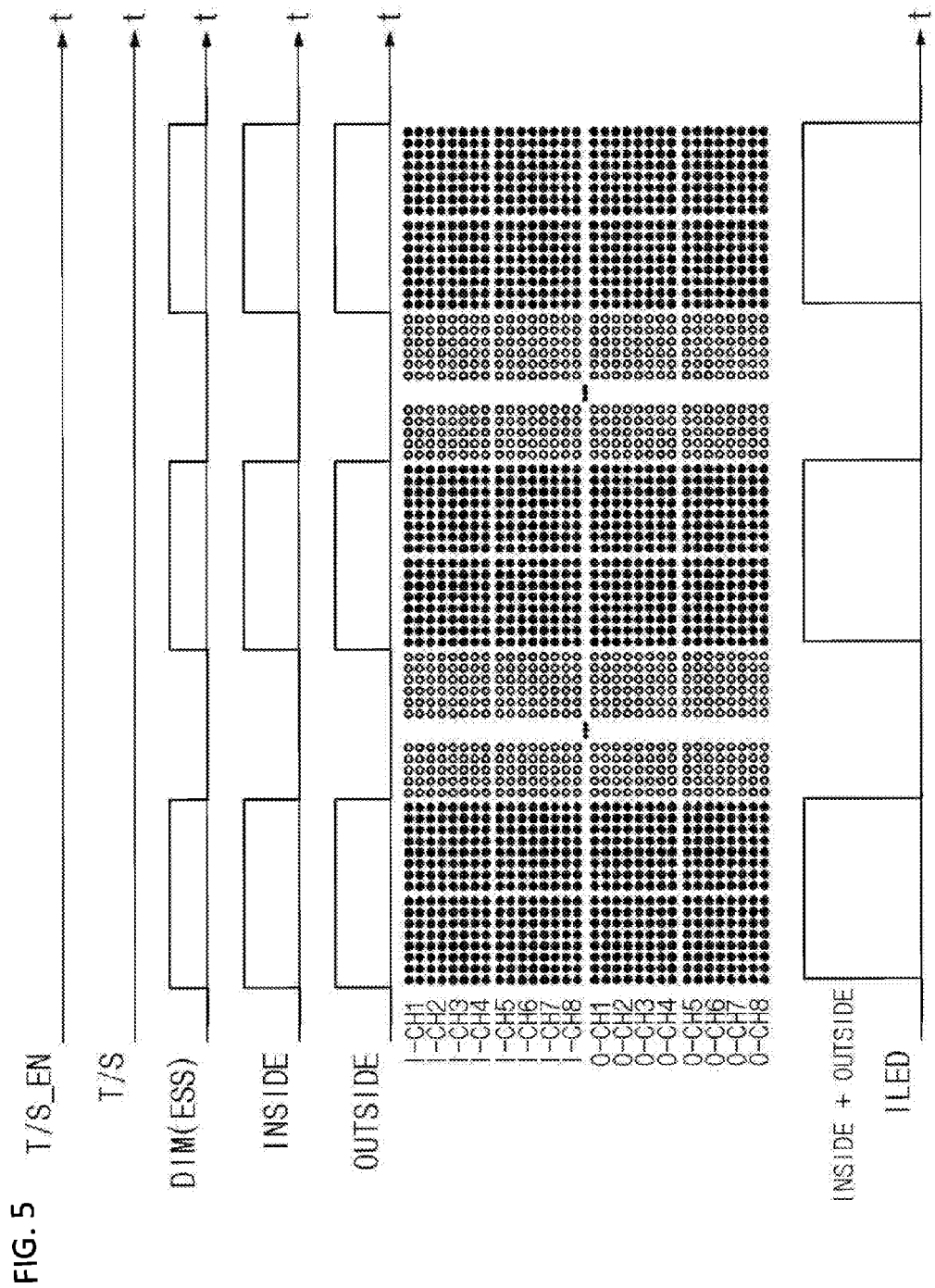

FIG. 3 is a diagram illustrating a representation of an example of a turn signal lamp to which the lamp control device of FIG. 2 is applied, and FIGS. 4 and 5 are representations of examples of waveform diagrams to assist in the explanation of an operation process in FIG. 2. FIG. 4 is a waveform diagram illustrating sequential turn-on by the turn signal T/S of FIG. 2, and FIG. 5 is a waveform diagram illustrating simultaneous flickering by the emergency stop signal ESS of FIG. 2.

Referring to FIG. 4, if an enable signal T/S_EN is enabled by a driver's manipulation of a turn signal switch (not shown), the turn signal T/S is cyclically enabled.

While the turn signal T/S is enabled, the first to eighth channels I_CH1 to I_CH8 of the LED module 50 corresponding to the inside (see FIG. 3) of the lamp RCL positioned on the trunk of a vehicle are sequentially turned on with the interval of the first delay time T1 after passage of the first delay time T1.

The first to eighth channels O_CH1 to O_CH8 of the LED module 52 corresponding to the outside (see FIG. 3) of the lamp RCL positioned on the body of the vehicle are sequentially turned on with the interval of the first delay time T1 after passage of the second delay time T2.

In this way, the first to eighth channels I_CH1 to I_CH8 and O_CH1 to O_CH8 of the LED modules 50 and 52 are sequentially turned on while the turn signal T/S is enabled, and a total current ILED flowing through the LED modules 50 and 52 is increased stepwise each time the first to eighth channels I_CH1 to I_CH8 and O_CH1 to O_CH8 are sequentially turned on one by one (see FIG. 4).

Referring to FIG. 5, if the driver suddenly stops the vehicle, the emergency stop signal ESS is enabled, and the dim signal DIM corresponding to the emergency stop signal ESS is enabled. Consequently, the LED modules 50 and 52 may be simultaneously flickered and perform the function of an emergency lamp. The flickering times and turn-on times of the LED modules 50 and 52 may be set to times prescribed in the rules of respective countries.

FIG. 6 is a representation of an example of a timing diagram to assist in the explanation of a method for controlling the lamp control device in accordance with the second embodiment of the present disclosure. In detail, FIG. 6 is a timing diagram illustrating a process in which the internal voltages VIN are supplied to the controllers 20 and 22 in correspondence to the turn signal T/S and the LED modules 50 and 52 are sequentially turned on by the unit of channel.

Referring to FIGS. 2 and 6, if the turn signal T/S is enabled, the MCU 32 of the vehicle control unit 30 controls the battery voltage VB to be transferred to the converters 10 and 12. If the battery voltage VB is supplied by the MCU 32, the converters 10 and 12 generate the internal voltages VIN and the output voltages VOUT, and supply the internal voltages VIN to the controllers 20 and 22 and supply the output voltages VOUT to the LED modules 50 and 52.

Referring to FIG. 6, the controller 20 receives the internal voltage VIN from the converter 10, and enables a counting start signal Start when the internal voltage VIN reaches the target level. If the counting start signal Start is enabled, the controller 20 starts counting of the first delay time T1 from the falling time of the counting start signal Start. At the same time with this, the controller 22 starts counting of the second delay time T2 from the falling time of the counting start signal Start.

The controller 20 sequentially turns on the first to eighth channels I_CH1 to I_CH8 of the LED module 50 with the interval of the first delay time T1 after passage of the first delay time T1. While it is illustrated in the present embodiment that the first to eighth channels I_CH1 to I_CH8 of the LED module 50 are sequentially turned on with the interval of the first delay time T1 after passage of the first delay time T1, this is nothing but an illustration purpose only and it is to be noted that delay times T1 between the first to eighth channels I_CH1 to I_CH8 may be set to be different partially or entirely.

The controller 22 starts counting of the first delay time T1 when counting of the second delay time T2 is completed, and sequentially turns on the first to eighth channels O_CH1 to O_CH8 of the LED module 52 with the interval of the first delay time T1. Herein, the second delay time T2 may be set as the sum of a time in which all the channels of the LED module 50 driven by the controller 20 are sequentially turned on and the first delay time T1.

While FIGS. 2 and 6 illustrate that, after the first to eighth channels I_CH1 to I_CH8 of the LED module 50 corresponding to the controller 20 are sequentially turned on, the first to eighth channels O_CH1 to O_CH8 of the LED module 52 corresponding to the controller 22 are sequentially turned on, it is to be noted that the present disclosure may be applied to the case where, after the first to eighth channels I_CH1 to I_CH8 of the LED module 50 corresponding to one controller 20 are sequentially turned on, the first to eighth channels of LED modules corresponding to a plurality of controllers are sequentially turned on. In this regard, second delay times T2 may be set differently for the plurality of controllers. For instance, after the first to eighth channels I_CH1 to I_CH8 of the LED module 50 corresponding to one controller 20 are sequentially turned on, second delay times T2 may be set differently for the remaining controllers such that the first to eighth channels of a plurality of LED modules corresponding to the remaining controllers are sequentially turned on.

Meanwhile, if the dim signal DIM corresponding to the emergency stop signal ESS is enabled, the controller 20 and the controller 22 simultaneously flicker the LED modules 50 and 52, and thereby convert the lamp RCL of a turn signaling function into the function of an emergency lamp.

As described above, in the present embodiment, the aesthetic appearance of a vehicle may be improved by sequentially turning on the LED modules 50 and 52 through counting of predetermined delay times.

Also, as described above, in the present embodiment, by automatically converting, in correspondence to the emergency stop signal ESS, a lamp of a turn signaling function into the function of an emergency lamp, occurrence of a vehicle accident may be prevented and driving stability may be improved.

Figure 7:
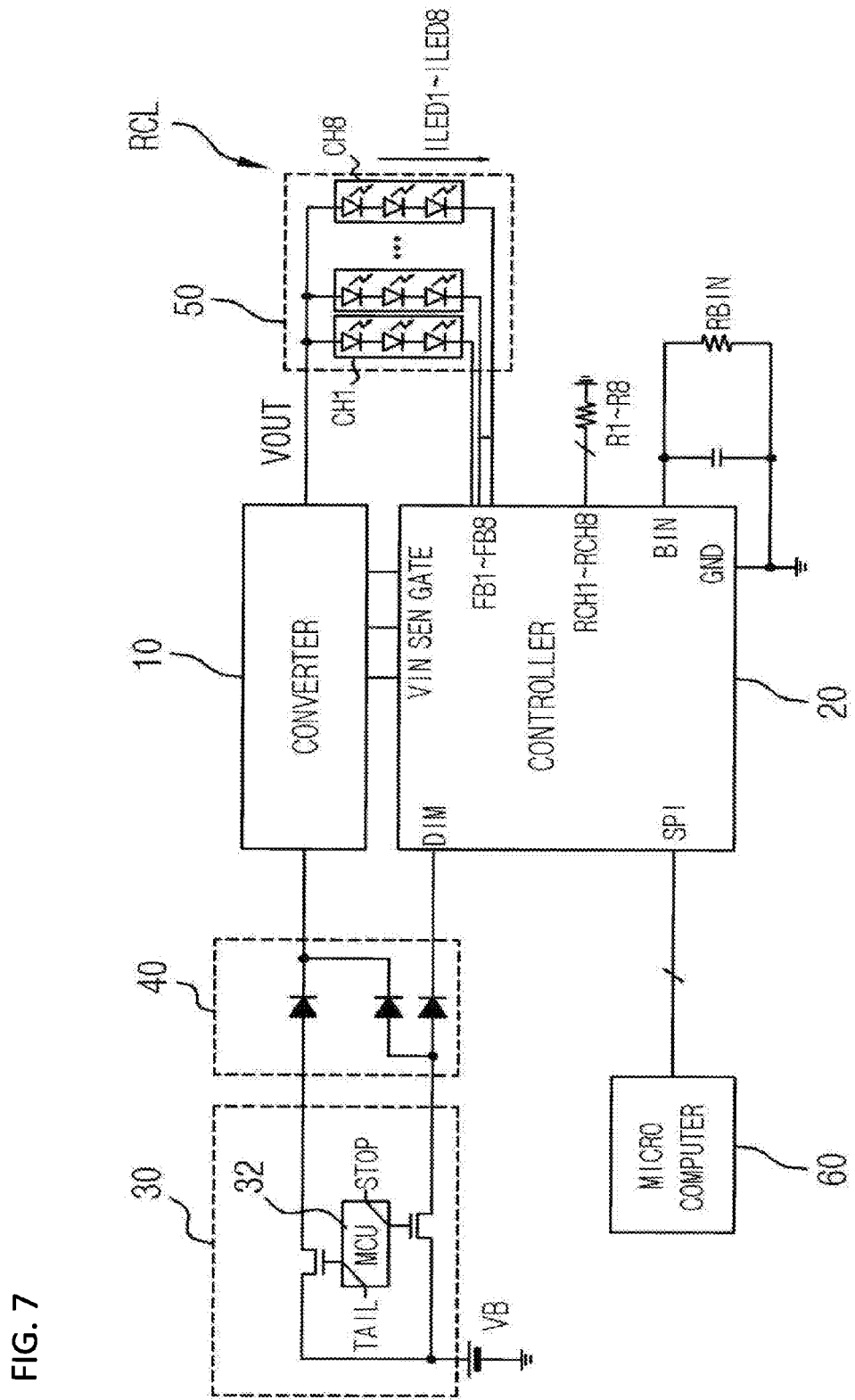
FIG. 7 is a representation of an example of a diagram to assist in the explanation of a lamp control device in accordance with a third embodiment of the present disclosure.

FIG. 7 is a representation of an example of a diagram to assist in the explanation of a lamp control device in accordance with a third embodiment of the present disclosure.

Referring to FIG. 7, the lamp control device according to the third embodiment includes a lamp RCL, a converter 10 and a controller 20.

The lamp RCL includes an LED module 50 which has a plurality of LED channels. The plurality of LED channels in the LED module 50 may be configured in parallel. The third embodiment illustrated in FIG. 7 exemplifies that one controller 20 drives the LEDs of first to eighth channels CH1 to CH8 of the LED module 50.

A vehicle control unit 30 includes an MCU (micro control unit) 32, and controls a battery voltage VB to be transferred to the converter 10 in correspondence to a tail lamp signal TAIL and a stop signal STOP. Between the vehicle control unit 30 and the converter 10 and the controller 20, there may be disposed a path unit 40 including a path in which the battery voltage VB is transferred and a path in which a dim signal DIM is transferred. The path unit 40 transfers the battery voltage VB outputted from the vehicle control unit 30, to the converter 10, and transfers the dim signal DIM to the controller 20.

The converter 10 generates an output voltage VOUT and an internal voltage VIN by using the battery voltage VB supplied from the vehicle control unit 30, and supplies the output voltage VOUT to the LED module 50 and supplies the internal voltage VIN to the controller 20. For instance, as the converter 10, a buck converter may be used.

The controller 20 receives the dim signal DIM, and controls the first to eighth channels CH1 to CH8 to be independently dimmed by memory values set in advance, in correspondence to the logic state of the dim signal DIM. The memory values may set at least any one among a brightness by channel, a delay between channels, a turn-on sequence among channels, a duty by channel, determination of use/non-use of a channel, a current by channel and a reference voltage, in correspondence to a stop lamp and a tail lamp of a vehicle.

A memory which stores the memory values may be configured in the controller 20, and an OTP (one time programmable) type capable of storing memory values only one time and an MTP (multi-time programmable) type capable of storing memory values a number of times may be used. If the internal voltage VIN is supplied with the dim signal DIM disabled, the controller 20 controls the first to eighth channels CH1 to CH8 to be dimmed by memory values corresponding to the tail lamp signal TAIL, and, if the dim signal DIM is enabled, the controller 20 controls the first to eighth channels CH1 to CH8 to be dimmed by memory values corresponding to the stop signal STOP. For instance, the memory values may be set in such a manner that the brightness of an LED channel corresponding to the stop signal STOP is higher than the brightness of an LED channel corresponding to the tail lamp signal TAIL.

Meanwhile, the controller 20 controls the output voltage VOUT of the converter 10 to be retained at a level equal to or higher than a predetermined level, by using feedback voltages FB1 to FB8 of the first to eighth channels CH1 to CH8. The controller 20 detects a minimum feedback voltage among the feedback voltages FB1 to FB8, and controls the output voltage VOUT to be retained at a level equal to or higher than the predetermined level, through the power switches (not shown) of the converter 10, such that the detected minimum feedback voltage does not fall to be lower than a target minimum feedback voltage. In this way, the controller 20 controls the converter 10 such that the output voltage VOUT may be stably supplied to the first to eighth channels CH1 to CH8 despite a variation in the battery voltage VB transferred from the vehicle control unit 30 or a variation in a load. The controller 20 controls channel currents ILED1 to ILED8 of the respective first to eighth channels CH1 to CH8 through switching elements (for example, FETs/BJTs) such that the first to eighth channels CH1 to CH8 are independently dimmed in correspondence to the memory values set in advance. The switching elements may be configured inside or outside the controller 20. While, in the present embodiment, the switching elements are configured to be disposed in the controller 20, it is to be noted that the present embodiment is not limited thereto.

FIG. 8 is a diagram illustrating a representation of an example of a memory map set in the controller 20 of FIG. 7.

For instance, referring to FIG. 8, the brightness and delay values of the first to eighth channels CH1 to CH8 may be set in addresses 00 to 04, set values SET1 to SET5 for mode identification, reference voltages VREF1<0:3> and VREF2<0:3> for the first to eighth channels CH1 to CH8 and oscillation frequencies OSC<0:2> may be set in addresses 05 and 06, and other values ETC<1:8> may be set in an address 07. In this way, memory values may be mapped in a memory.

The memory may be configured by using an internal or external memory. In the case of an MTP type internal memory, an EEPROM (electrically erasable programmable read-only memory) may be used. Since such memory cells have limits in write and erase counts, backup cells may be disposed for partial or entire memory cells which are expected to be frequently changed. For instance, if the brightness value of the first channel CH1 is set in the address 00, replacement may be made from the address 00 to the address 01 in the case where the lifetime of the first channel CH1 ends as the brightness value of the first channel CH1 is written and erased a number of times. In order to realize this, configuration may be made such that an address is automatically changed when a predetermined target count is reached by counting each write and erase.

The memory values in the memory may be changed through an external micro computer 60. The controller 20 may be configured to communicate with the micro computer 60 through at least any one among an SPI (serial peripheral interface), an LIN (local interconnect network), a CAN (controller area network) and an optionally prescribed protocol. Also, in the present embodiment, besides the above-described protocols, the micro computer 60 and the controller 20 may be configured to communicate with each other through at least any one of other wired communication protocols and wireless communication protocols.

Figure 9:
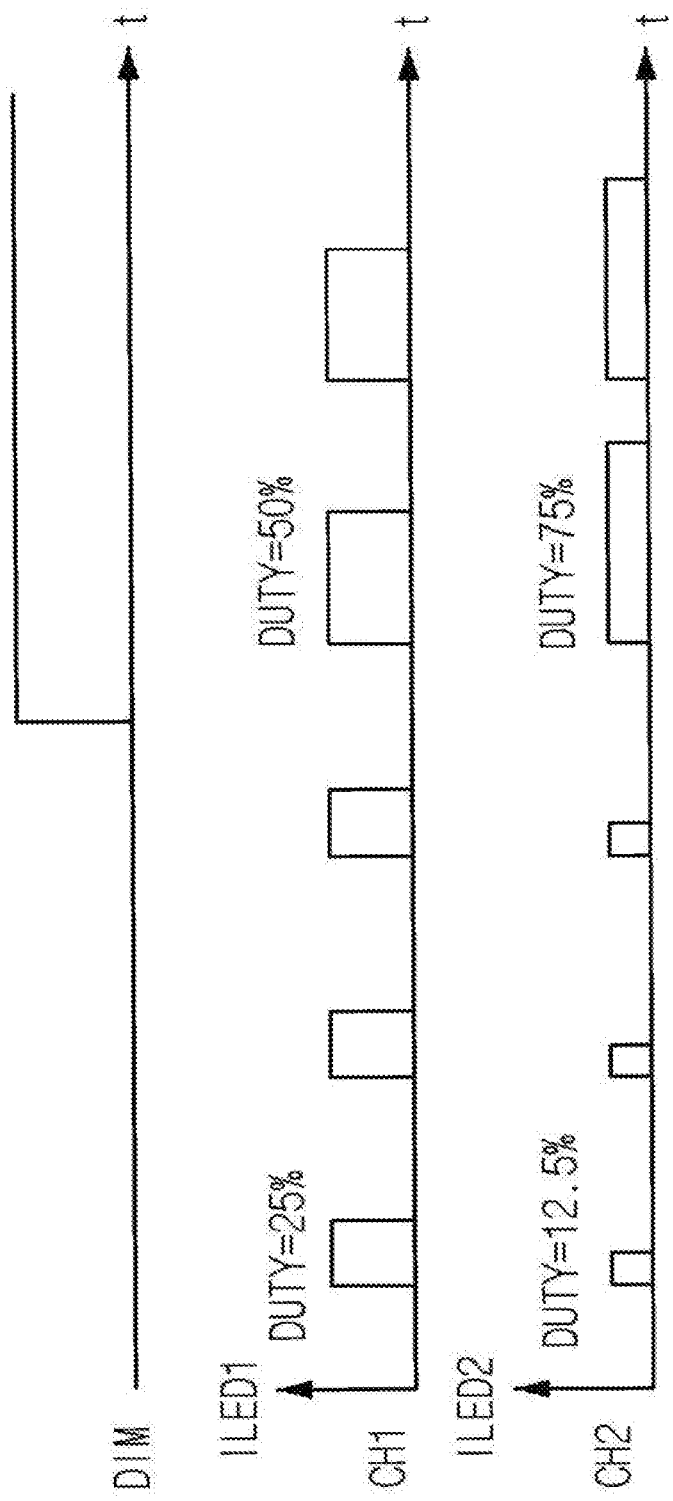
FIG. 9 is a diagram illustrating a representation of an example of setting of memory values, by channel, corresponding to states of a dim signal in FIG. 7.

FIG. 9 is a diagram illustrating a representation of an example of setting of memory values, by channel, corresponding to states of the dim signal DIM in FIG. 7.

Referring to FIG. 9, the first channel CH1 and the second channel CH2 may be set differently in duties and the magnitudes of channel currents ILED1 and ILED2 in the state in which the dim signal DIM is disabled, and may be set differently in duties and the magnitudes of the channel currents ILED1 and ILED2 even in the state in which the dim signal DIM is enabled. For instance, the duty of the first channel CH1 may be set, with the dim signal DIM disabled, to be larger than the duty of the second channel CH2, and may be set, with the dim signal DIM enabled, to be smaller than the duty of the second channel CH2. Further, regardless of the states of the dim signal DIM, the magnitude of the channel current ILED1 of the first channel CH1 may be set to be larger than the magnitude of the channel current ILED2 of the second channel CH2.

That is to say, in the present embodiment, memory values may be set differently for channels such that independent dimming control for channels is possible. The memory values may be set differently for channels, even in correspondence to the states of the dim signal DIM.

Meanwhile, in the present embodiment, the channel currents ILED1 to ILED8 may be regulated by not only the memory values set differently for channels but also channel resistors R1 to R8 and a bin resistor RBIN.

Referring to FIG. 7, the control unit 20 includes channel resistor terminals RCH1 to RCH8 one-to-one corresponding to the first to eighth channels CH1 to CH8 of the LED module 50, and the channel resistors R1 to R8 are connected to the channel resistor terminals RCH1 to RCH8. The channel currents ILED1 to ILED8 of the first to eighth channels CH1 to CH8 are respectively regulated according to the resistance values of the channel resistors R1 to R8. For instance, when the resistance value of the second channel CH2 is set to two times the resistance value of the first channel CH1, the channel current of the first channel CH1 may be two times the channel current of the second channel CH2. In the present embodiment, as described above, by setting the resistance values of the channel resistors R1 to R8 to be different for channels, it is possible to regulate the channel currents ILED1 to ILED8.

The controller 20 includes a bin resistor terminal BIN for regulating the channel currents ILED1 to ILED8 of the first to eighth channels CH1 to CH8, and the bin resistor RBIN is connected to the bin resistor terminal BIN. The channel currents ILED1 to ILED8 of the first to eighth channels CH1 to CH8 are regulated at the same rate at once according to the resistance value of the bin resistor RBIN. For instance, if the resistance value of the bin resistor RBIN is increased to three times, the channel currents ILED1 to ILED8 of the first to eighth channels CH1 to CH8 which are set by the resistance values of the channel resistors R1 to R8 are equally decreased to one third times. In the present embodiment, as described above, by setting the resistance value of the bin resistor RBIN, it is possible to regulate the channel currents ILED1 to ILED8 of all the first to eighth channels CH1 to CH8 at the same rate.

The controller 20 according to the present embodiment may set an set option SET_OPTS for determining whether to control the lamp RCL by memory values corresponding to a tail lamp and a stop lamp or whether to control the lamp RCL by memory values corresponding to a turn signal lamp and an emergency stop lamp.

FIG. 10 is a diagram illustrating a representation of an example of a set option to be set in the controller 20 of FIG. 7.

Referring to FIG. 10, the set option SET_OPTS for determining whether to control the first to eighth channels CH1 to CH8 of the LED module 50 by memory values corresponding to a tail and a stop or a turn and a sudden stop is set in the controller 20. For instance, if the set option SET_OPTS is set to 'low,' the controller 20 controls the first to eighth channels CH1 to CH8 to be dimmed by memory values corresponding to a tail lamp or a stop lamp in correspondence to the state of the dim signal DIM, and, if the set option SET_OPTS is set to 'high,' the controller 20 controls the first to eighth channels CH1 to CH8 to be sequentially turned on or be simultaneously flickered by memory values corresponding to a turn or a sudden stop in correspondence to the state of the dim signal DIM.

The above-described embodiments of FIGS. 1 and 2 may be understood as that the set option SET_OPTS is set to 'high,' and the embodiment of FIG. 7 may be understood as that the set option SET_OPTS is set to 'low.' In other words, in the embodiments of FIGS. 1 and 2, the first to eighth channels CH1 to CH8 are controlled to be sequentially turned on or be simultaneously flickered in correspondence to the state of the dim signal DIM, and, in the embodiment of FIG. 7, the first to eighth channels CH1 to CH8 are controlled to be dimmed by memory values set in advance, in correspondence to the state of the dim signal DIM.

In this way, in the present embodiment, even though a plurality of LED channels are adopted in the vehicle lamp RCL, it is possible to stably perform independent dimming control for channels, by using memory values set in advance.

Moreover, in the present embodiment, the memory values set in advance may be easily changed through link with the micro computer 60.

In addition, in the present embodiment, the channel currents ILED1 to ILED8 of the first to eighth channels CH1 to CH8 may be easily regulated individually or entirely by using the channel resistors R1 to R8 and the bin resistor RBIN.

Figure 11:
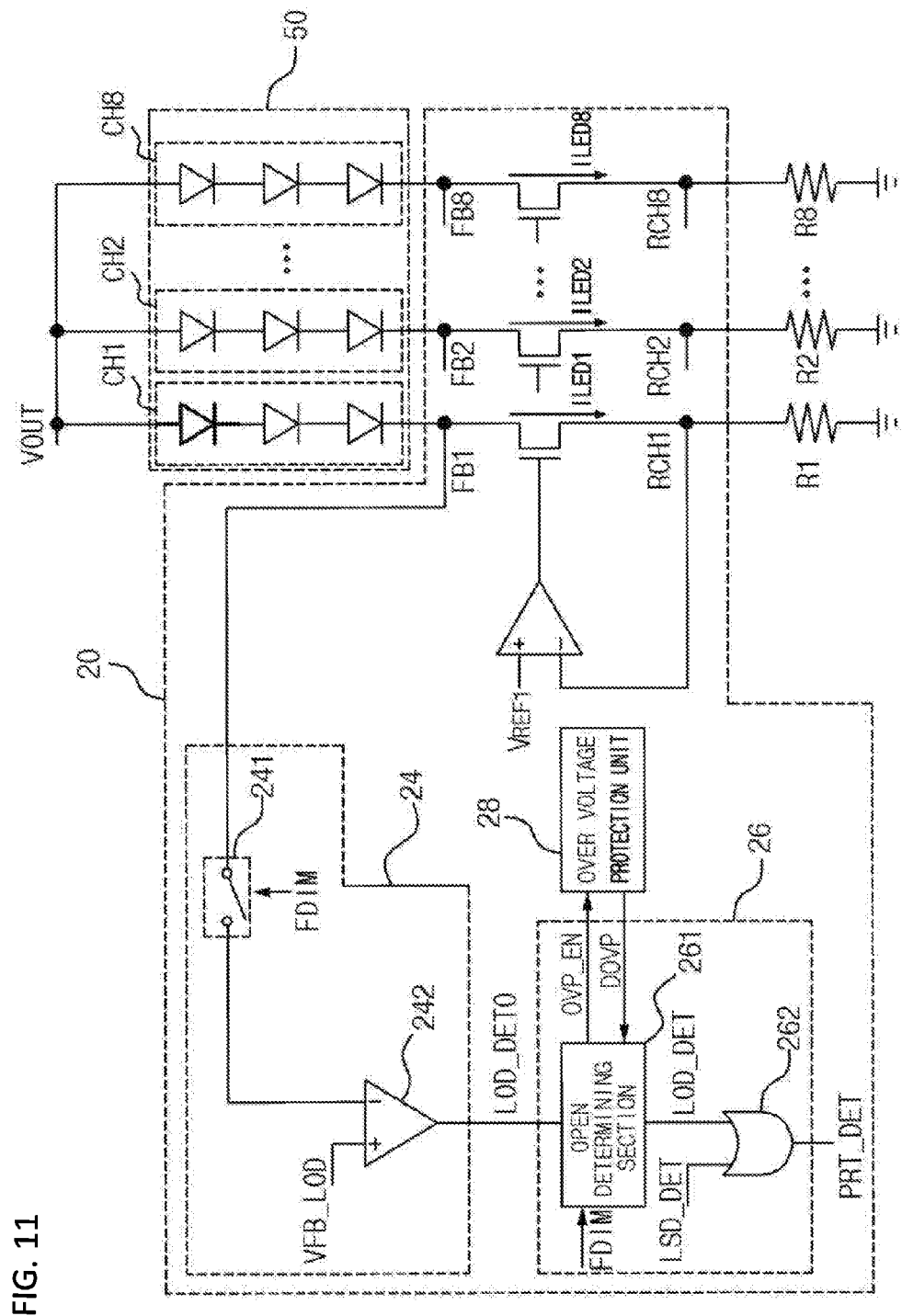
FIG. 11 is a representation of an example of a diagram to assist in the explanation of a lamp control device in accordance with a fourth embodiment of the present disclosure.
Figure 12:
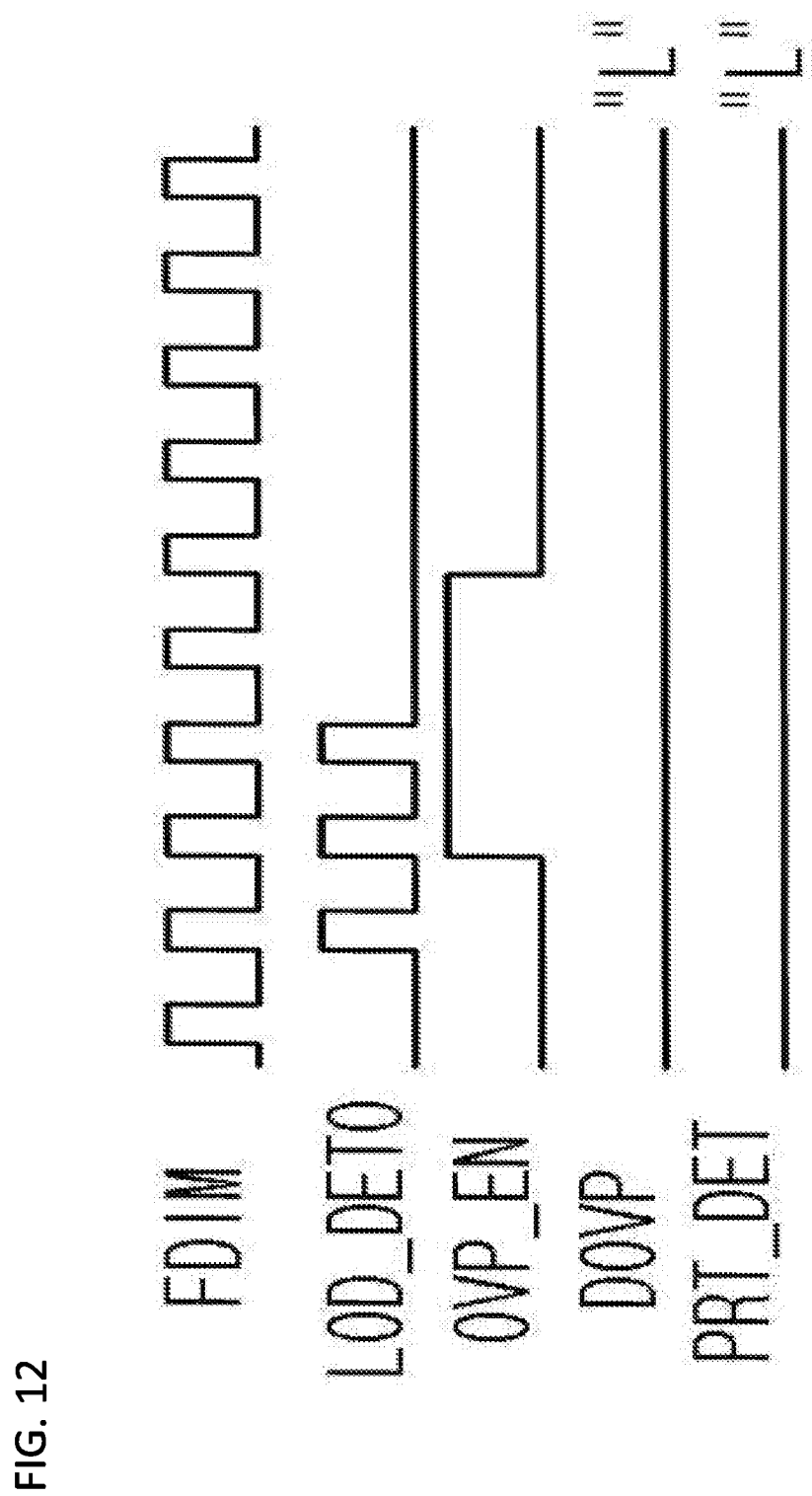
FIGS. 12 to 14 are representations of examples of timing diagrams to assist in the explanation of an operation process in FIG. 11.
Figure 13:
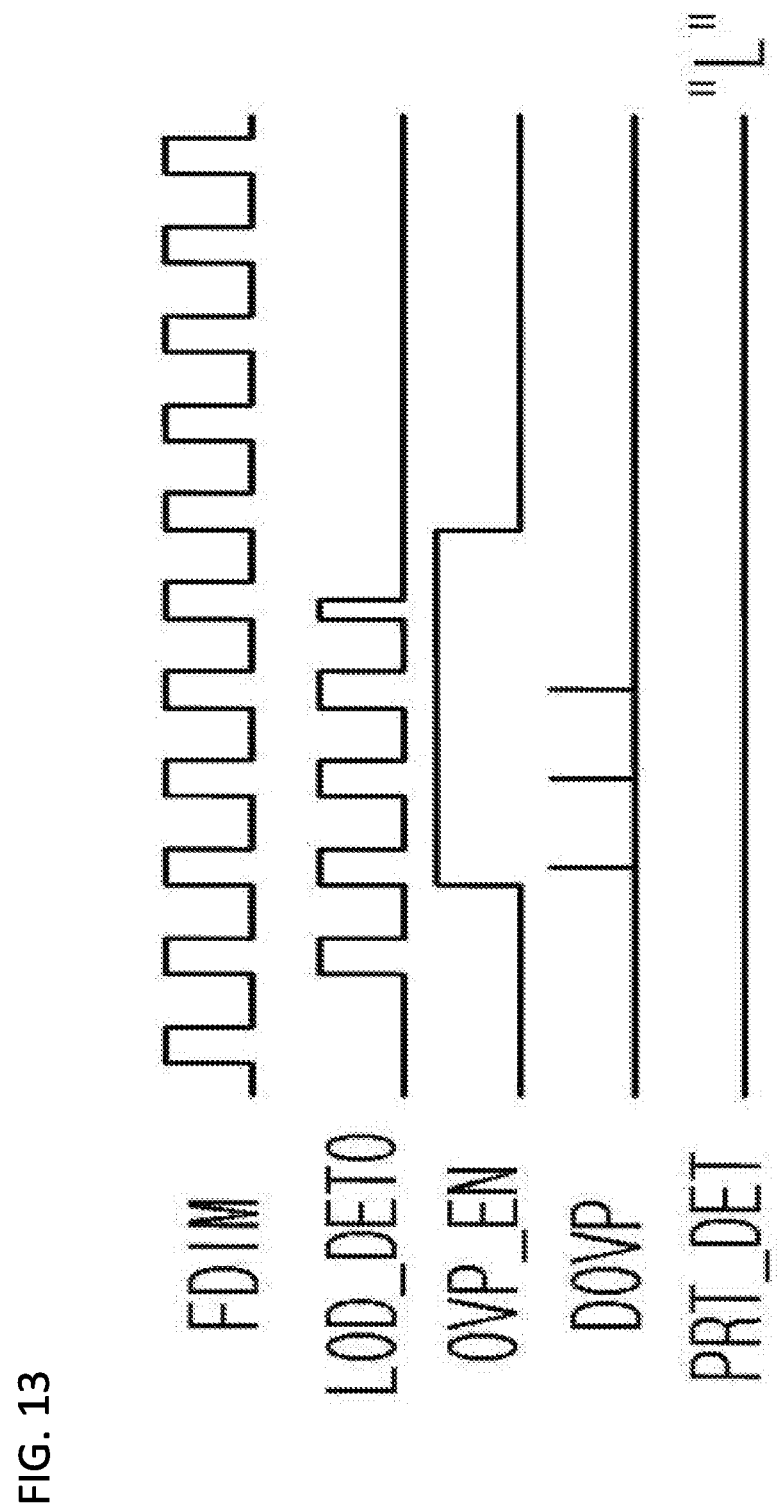
Figure 14:
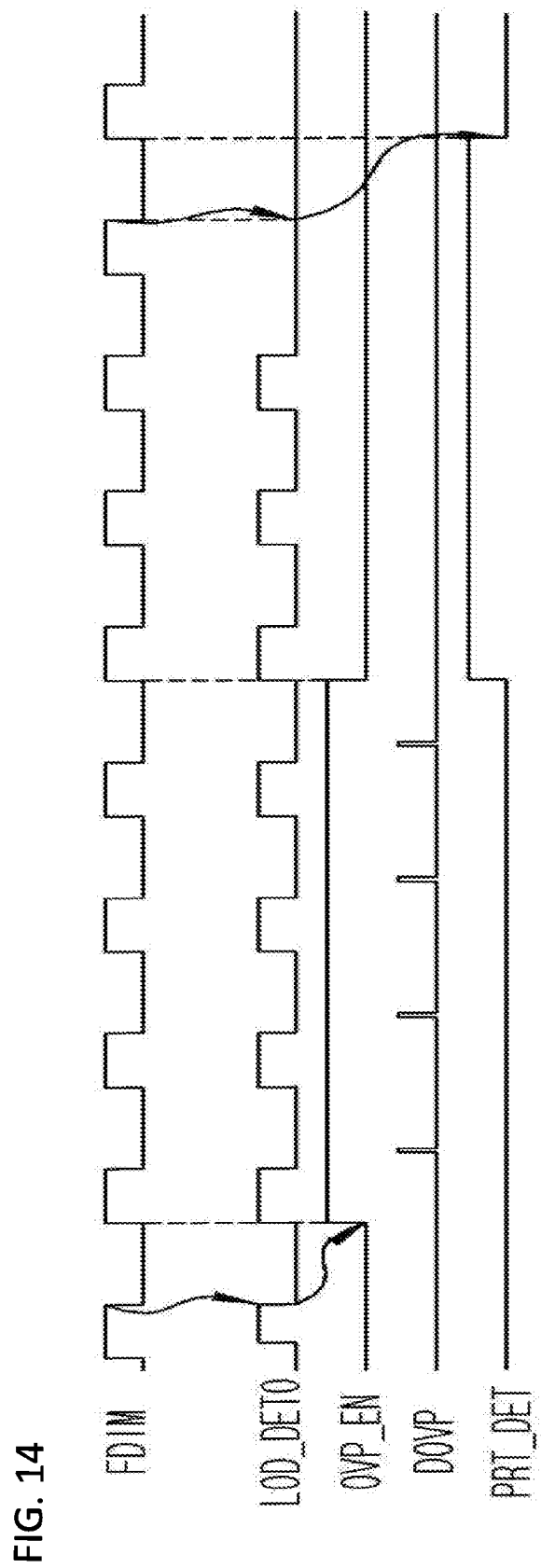

FIG. 11 is a representation of an example of a diagram to assist in the explanation of a lamp control device in accordance with a fourth embodiment of the present disclosure, and FIGS. 12 to 14 are representations of examples of timing diagrams to assist in the explanation of an operation process in FIG. 11.

Referring to FIG. 11, the lamp control device according to the fourth embodiment includes a lamp RCL and a controller 20.

The lamp RCL includes an LED module 50 which has a plurality of LED channels. The plurality of LED channels of the LED module 50 may be configured in parallel. The fourth embodiment illustrated in FIG. 11 exemplifies that one controller 20 drives the LEDs of first to eighth channels CH1 to CH8 of the LED module 50 and that an open occurs in the first channel CH1 among the first to eighth channels CH1 to CH8.

The controller 20 detects feedback voltages FB1 to FB8 of the first to eighth channels CH1 to CH8 in correspondence to a channel dimming signal FDIM, and checks whether an over voltage protection signal DOVP is generated by a predetermined reference count, when at least any one among the detected feedback voltages FB1 to FB8 is lower than a reference voltage VFB_LOD. The controller 20 determines that a corresponding channel is open, when the over voltage protection signal DOVP is generated by the predetermined reference count.

For instance, when the feedback voltage FB1 of the first channel CH1 is detected to be lower than the reference voltage VFB_LOD and the over voltage protection signal DOVP is detected four times successively, the controller 20 determines that the first channel CH1 is open (see FIG. 14). The channel dimming signal FDIM is a pulse width modulation signal for controlling the currents of the first to eighth channels CH1 to CH8, and the over voltage protection signal DOVP is a signal which is generated when an over voltage protection operation is performed due to a rise in an output voltage VOUT by an open. Namely, the controller 20 determines whether a channel is open, by monitoring the feedback voltages FB1 to FB8 of the first to eighth channels CH1 to CH8 and the over voltage protection signal DOVP.

The controller 20 excludes the feedback voltage FB1 of the first channel CH1 determined as an open, from regulation of the output voltage VOUT. The controller 20 regulates the output voltage VOUT by using a minimum feedback voltage, when at least any one among the feedback voltages FB1 to FB8 is lower than the reference voltage VFB_LOD. In the present embodiment, in order to prevent the output voltage VOUT from overly increasing by the feedback voltage FB1 of the first channel CH1 which is open, the feedback voltage FB1 of the first channel CH1 is excluded from regulation.

Even though the controller 20 excludes the feedback voltage FB1 of the first channel CH1 from regulation, the controller 20 is configured to be able to continuously monitor the feedback voltage FB1 even for the first channel CH1. For instance, the controller 20 may be configured to monitor the feedback voltage FB1 of the first channel CH1 at the falling edge of the channel dimming signal FDIM. If the feedback voltage FB1 is detected to be normal, the controller 20 automatically returns the first channel CH1 excluded from regulation, to a normal operation.

That is to say, in the present embodiment, configuration is made such that an open LED channel may be monitored to automatically perform a normal operation when a failed LED channel is replaced with a normal LED channel or is repaired.

The detailed configuration of the controller 20 will be described below. For the sake of convenience in explanation, it is exemplified that the feedback voltage FB1 of the first channel CH1 of the LED module 50 is monitored.

The controller 20 includes a monitoring unit 24, a monitoring control unit 26, and an over voltage protection unit 28.

The monitoring unit 24 provides a detection signal LOD_DET0 corresponding to the feedback voltage FB1 of the first channel CH1, to the monitoring control unit 26. The monitoring unit 24 includes a switch 241 which transfers the feedback voltage FB1 in correspondence to the channel dimming signal FDIM, and a comparing section 242 which compares the feedback voltage FB1 transferred from the switch 241 and the reference voltage VFB_LOD, enables the detection signal LOD_DET0 when the feedback voltage FB1 is lower than the reference voltage VFB_LOD and outputs the detection signal LOD_DET0 to the monitoring control unit 26. For instance, the comparing section 242 receives the feedback voltage FB1 through the negative input terminal thereof and the reference voltage VFB_LOD through the positive input terminal thereof, and enables the detection signal LOD_DET0 when the feedback voltage FB1 is lower than the reference voltage VFB_LOD, as shown in FIGS. 11 to 14.

The monitoring control unit 26 enables a channel protection signal PRT_DET when the over voltage protection signal DOVP is generated by the predetermined reference count, with the detection signal LOD_DET0 enabled. The monitoring control unit 26 includes an open determining section 261 and a mode converting section 262. The open determining section 261 enables an over voltage protection enable signal OVP_EN and outputs the over voltage protection enable signal OVP_EN to the over voltage protection unit 28 when the detection signal LOD_DET0 is enabled, and enables an open determination signal LOD_DET and outputs the open determination signal LOD_DET to the mode converting section 262 when the over voltage protection signal DOVP is generated from the over voltage protection unit 28 by the predetermined reference count. The mode converting section 262 enables the channel protection signal PRT_DET when the open determination signal LOD_DET is enabled.

The over voltage protection unit 28 performs the over voltage protection operation when the over voltage protection enable signal OVP_EN is enabled, and provides the over voltage protection signal DOVP which is generated by the over voltage protection operation, to the open determining section 261.

When the over voltage protection signal DOVP is generated from the over voltage protection unit 28 by the predetermined reference count, the open determining section 261 enables the open determination signal LOD_DET and outputs the open determination signal LOD_DET to the mode converting section 262, and the mode converting section 262 enables the channel protection signal PRT_DET. The controller 20 controls the first channel CH1 to operate under a channel protection mode, when the channel protection signal PRT_DET is enabled.

The controller 20 excludes, in the channel protection mode, the feedback voltage FB1 of the first channel CH1 determined as an open, from regulation, continuously monitors the feedback voltage FB1 in synchronization with the channel dimming signal FDIM, and releases the channel protection mode and returns the first channel CH1 to a normal operation when the feedback voltage FB1 is detected to be normal.

In the present embodiment, when the feedback voltage FB1 is retained to be lower than the reference voltage VFB_LOD but the over voltage protection signal DOVP is not generated as shown in FIG. 12, determination is not made to be an open. Also, in the present embodiment, when the feedback voltage FB1 is retained to be lower than the reference voltage VFB_LOD but the over voltage protection signal DOVP is not generated by the predetermined reference count as shown in FIG. 13, determination is not made, as well, to be an open.

In the present embodiment, when the feedback voltage FB1 is retained to be lower than the reference voltage VFB_LOD and the over voltage protection signal DOVP is generated by at least the predetermined reference count as shown in FIG. 14, determination is made to be an open, whereby an influence by noise may be minimized. Accordingly, in the present embodiment, as an influence by noise is minimized, malfunction of the lamp RCL may be precisely monitored. For instance, FIG. 14 exemplifies that the reference count is set to four.

Figure 15:
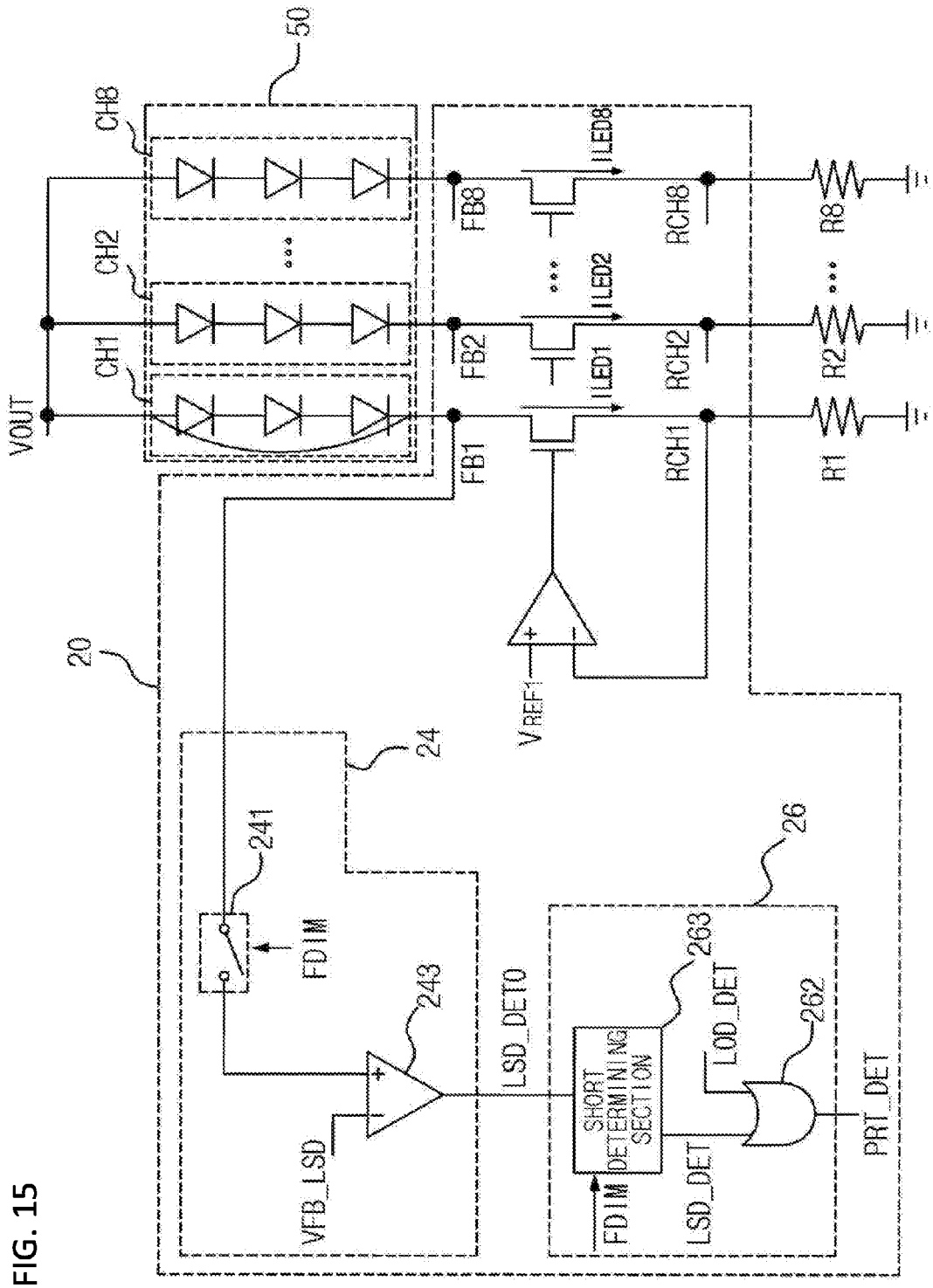
FIG. 15 is a representation of an example of a diagram to assist in the explanation of a lamp control device in accordance with a fifth embodiment of the present disclosure.
Figure 16:
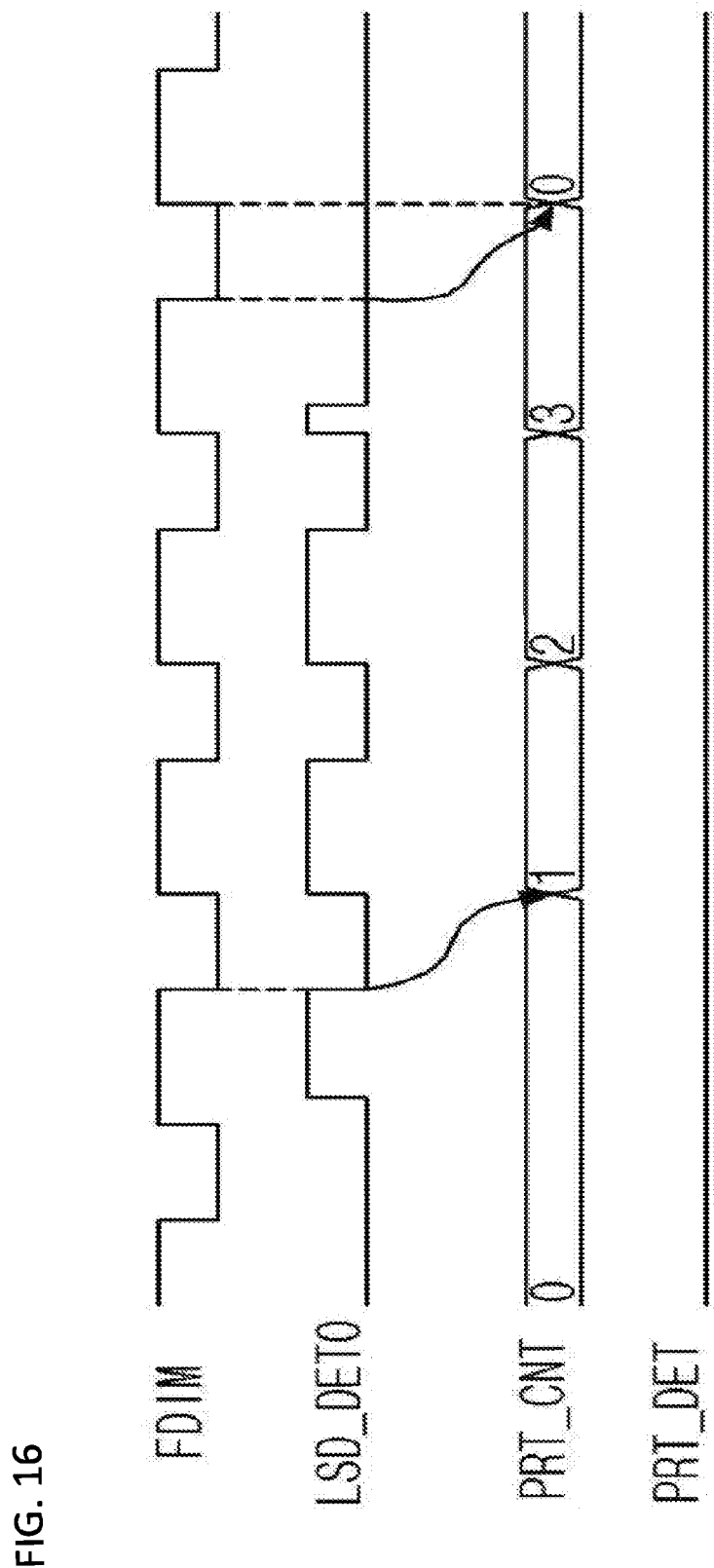
FIGS. 16 and 17 are representations of examples of timing diagrams to assist in the explanation of an operation process in FIG. 15.
Figure 17:
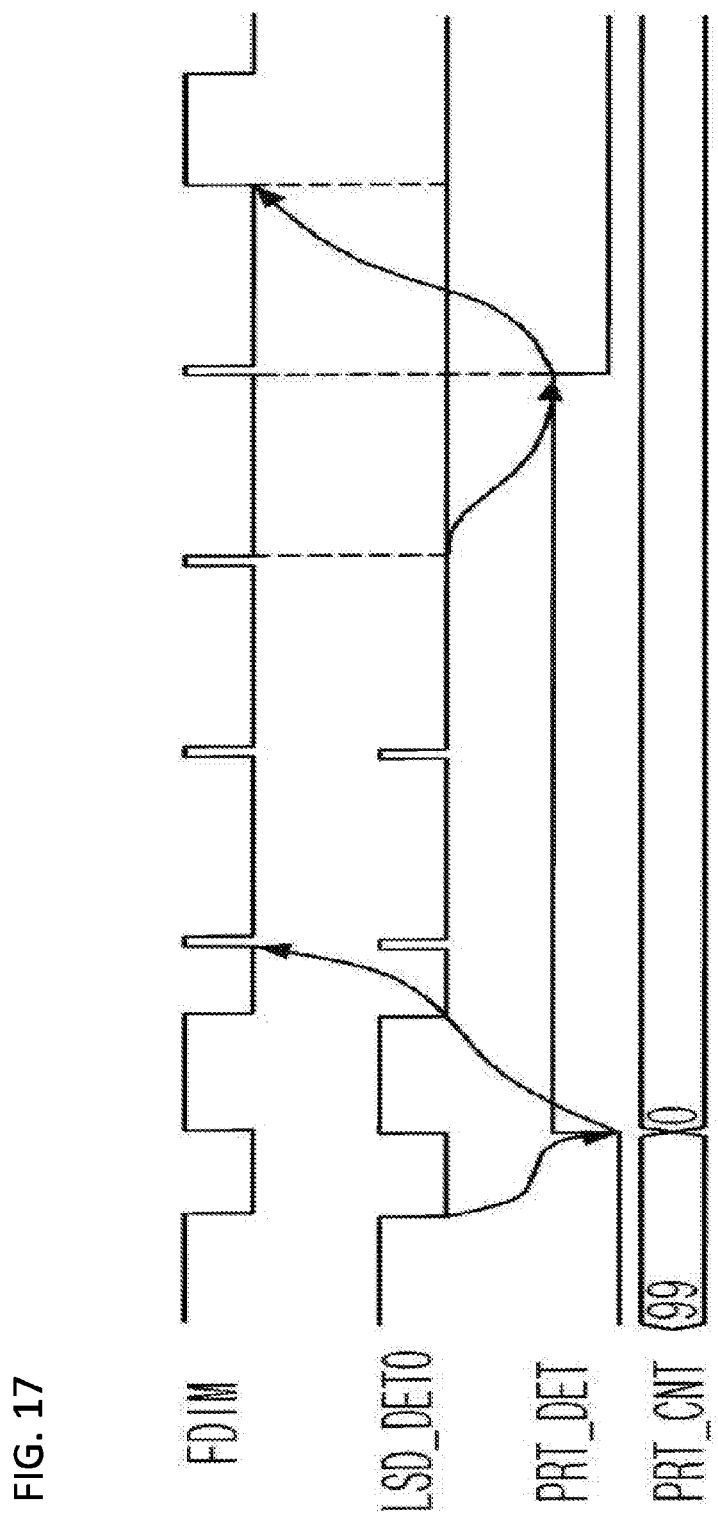

FIG. 15 is a representation of an example of a diagram to assist in the explanation of a lamp control device in accordance with a fifth embodiment of the present disclosure, and FIGS. 16 and 17 are representations of examples of timing diagrams to assist in the explanation of an operation process in FIG. 15. In detail, FIGS. 15 to 17 are exemplary diagrams for determining a short in a plurality of channels.

Referring to FIG. 15, the lamp control device according to the fifth embodiment includes a lamp RCL and a controller 20.

The lamp RCL includes an LED module 50 which has a plurality of LED channels. The plurality of LED channels in the LED module 50 may be configured in parallel. The fifth embodiment illustrated in FIG. 15 exemplifies that one controller 20 drives the LEDs of first to eighth channels CH1 to CH8 of the LED module 50 and that a short occurs in the first channel CH1 among the first to eighth channels CH1 to CH8.

The controller 20 determines whether there is a channel in which a short has occurred, among the first to eighth channels CH1 to CH8, by monitoring feedback voltages FB1 to FB8 of the first to eighth channels CH1 to CH8.

In detail, the controller 20 detects the feedback voltages FB1 to FB8 of the first to eighth channels CH1 to CH8 in correspondence to a channel dimming signal FDIM, and determines that a corresponding channel is shorted, when at least any one among the detected feedback voltages FB1 to FB8 is higher than a reference voltage VFB_LSD and the corresponding state is continuously retained for N number of clocks of the channel dimming signal FDIM. For instance, the controller 20 determines that a corresponding channel is shorted, when the state in which at least any one among the detected feedback voltages FB1 to FB8 is higher than the reference voltage VFB_LSD is continuously retained for 100 clocks of the channel dimming signal FDIM.

The controller 20 fixes the duty of a channel which is determined as a short, to a level at which an LED does not emit light. For instance, in the present embodiment, in order to prevent heat generation due to a short and prevent another LED channel from mis-operating by a shorted channel, the duty may be fixed to 5%.

The controller 20 monitors the feedback voltage of a channel which is determined as a short, and automatically returns the corresponding channel to a normal operation when the feedback voltage is detected to be normal. For instance, the controller 20 monitors the feedback voltage of a channel at the falling edge of the channel dimming signal FDIM, and restores the duty fixed to 5%, to the duty of a normal operation when the feedback voltage is detected to be normal.

The detailed configuration of the controller 20 will be described below. For the sake of convenience in explanation, it is exemplified that the feedback voltage FB1 of the first channel CH1 of the LED module 50 is monitored.

The controller 20 includes a switch 241, a comparing section 243, a short determining section 263, and a mode converting section 262.

First, the switch 241 transfers the feedback voltage FB1 of the first channel CH1 to the comparing section 243, with the channel dimming signal FDIM enabled.

The comparing section 243 compares the feedback voltage FB1 of the first channel CH1 and the reference voltage VFB_LSD, and enables a detection signal LSD_DET0 and outputs the detection signal LSD_DET0 to the short determining section 263, when the feedback voltage FB1 is higher than the reference voltage VFB_LSD. For instance, the comparing section 243 receives the feedback voltage FB1 through the positive input terminal thereof and the reference voltage VFB_LSD through the negative input terminal thereof and enables and outputs the detection signal LSD_DET0 when the feedback voltage FB1 is higher than the reference voltage VFB_LSD, as shown in FIGS. 15 to 17.

If the detection signal LSD_DET0 is enabled, the short determining section 263 enables and outputs a short determination signal LSD_DET when the state in which the feedback voltage FB1 is higher than the reference voltage VFB_LSD at the falling edge of the channel dimming signal FDIM is continuously retained for N (N is a natural number) number of clocks of the channel dimming signal FDIM.

For instance, the short determining section 263 increases a count when the feedback voltage FB1 is higher than the reference voltage VFB_LSD and initializes a count when the feedback voltage FB1 is lower than the reference voltage VFB_LSD (see FIG. 16). The short determining section 263 determines that the first channel CH1 is shorted, when a count becomes 100, that is, when the state in which the feedback voltage FB1 is higher than the reference voltage VFB_LSD is retained for 100 clocks of the channel dimming signal FDIM (see FIG. 17).

The mode converting section 262 enables and outputs a channel protection signal PRT_DET when the short determination signal LSD_DET is enabled. For instance, the mode converting section 262 may be configured by an OR gate element. The mode converting section 262 enables the channel protection signal PRT_DET when the short determination signal LSD_DET or an open determination signal LOD_DET is enabled.

Referring to FIG. 17, the controller 20 drives the first channel CH1 determined as a short, under a channel protection mode, when the channel protection signal PRT_DET is enabled. The controller 20 fixes the duty of the channel dimming signal FDIM to a level at which an LED does not emit light, in the channel protection mode, and monitors the feedback voltage FB1 of the first channel CH1 at the falling edge of the channel dimming signal FDIM.

If the feedback voltage FB1 is detected to be normal, at the falling edge of the channel dimming signal FDIM, the controller 20 releases the channel protection mode by disabling the channel protection signal PRT_DET at the rising edge of the channel dimming signal FDIM, and thereby restores the duty of the first channel CH1.

Figure 18:
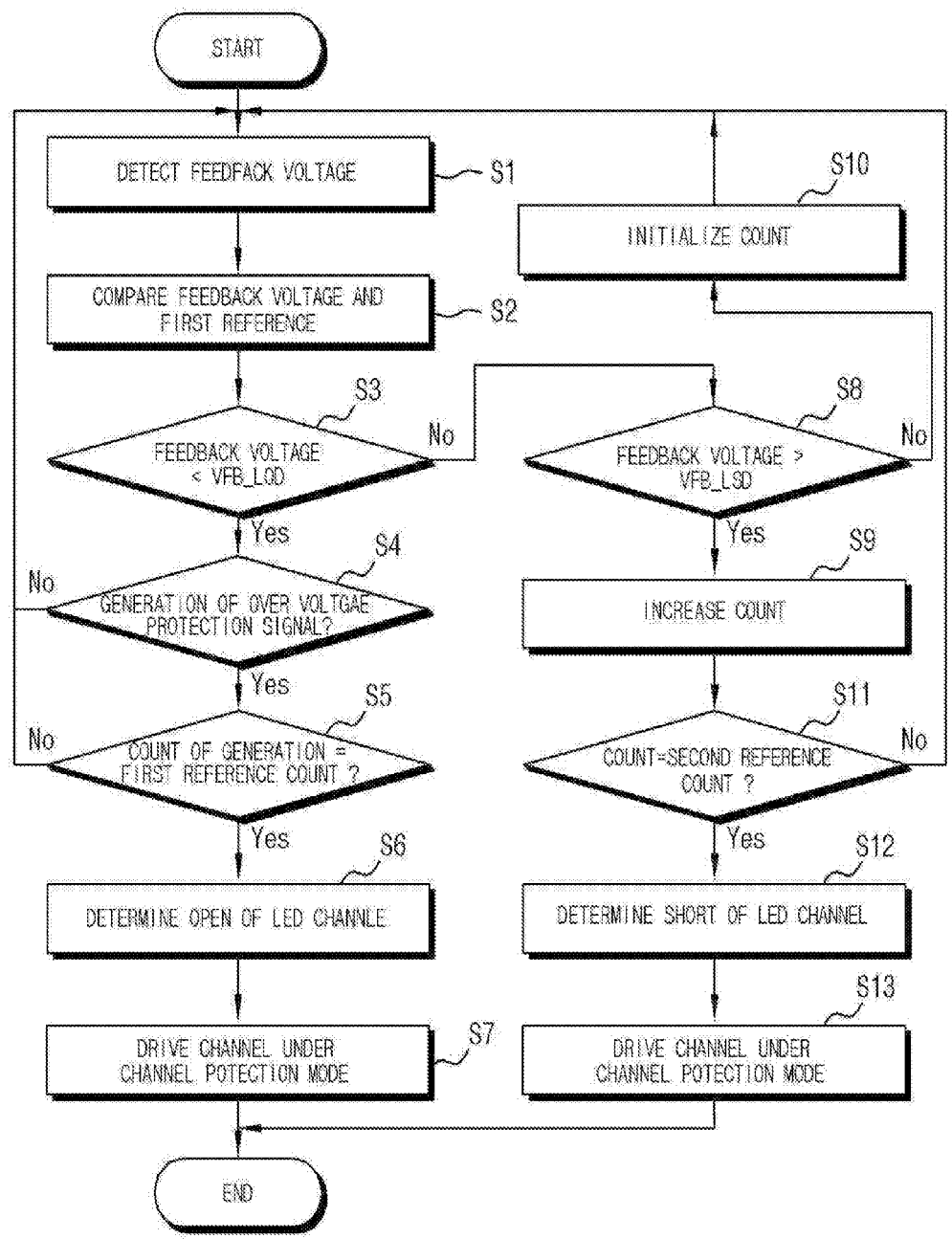
FIGS. 18 to 20 are representations of examples of flow charts to assist in the explanation of a method for monitoring a lamp control device in accordance with the fourth and fifth embodiments of the present disclosure.
Figure 19:
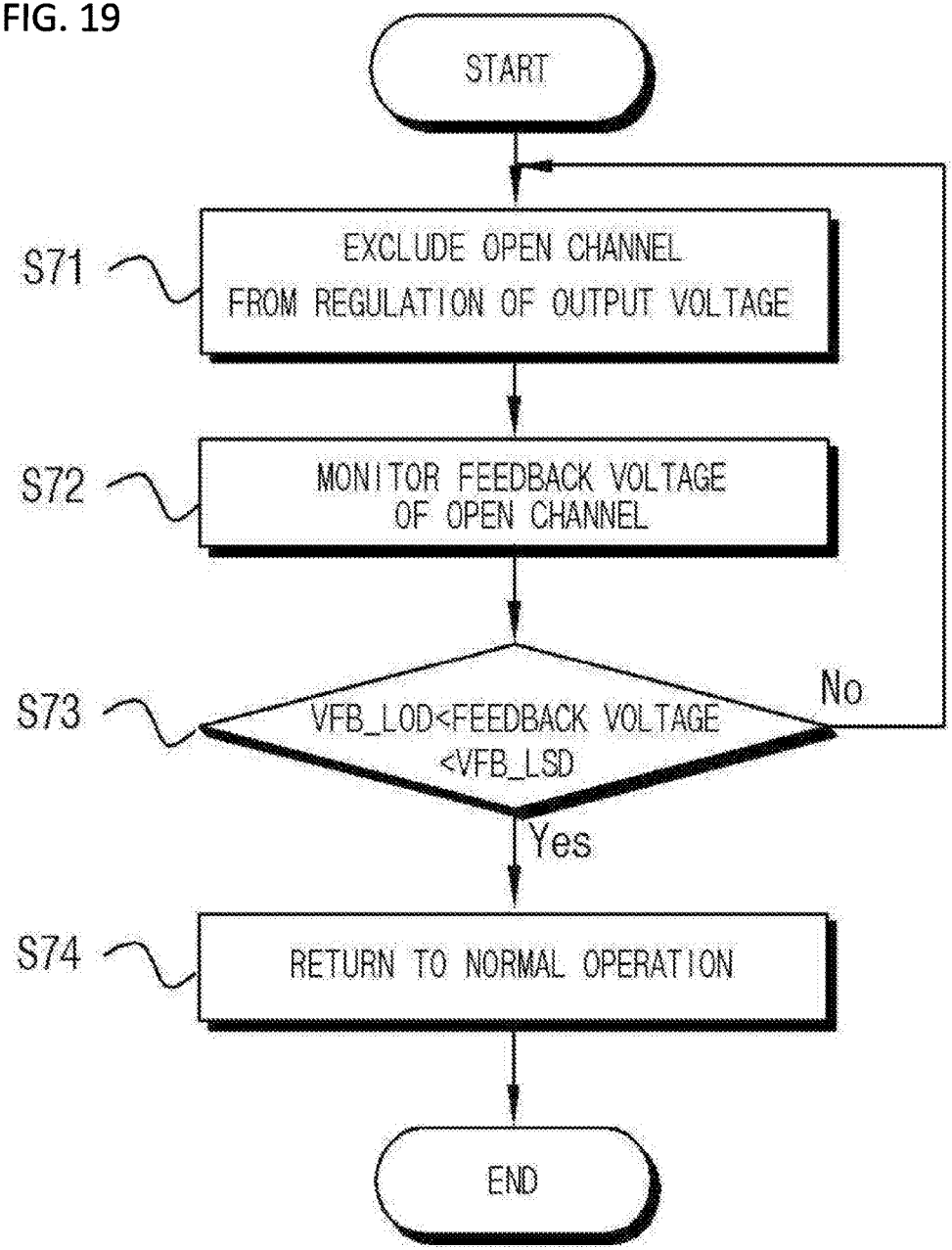
Figure 20:
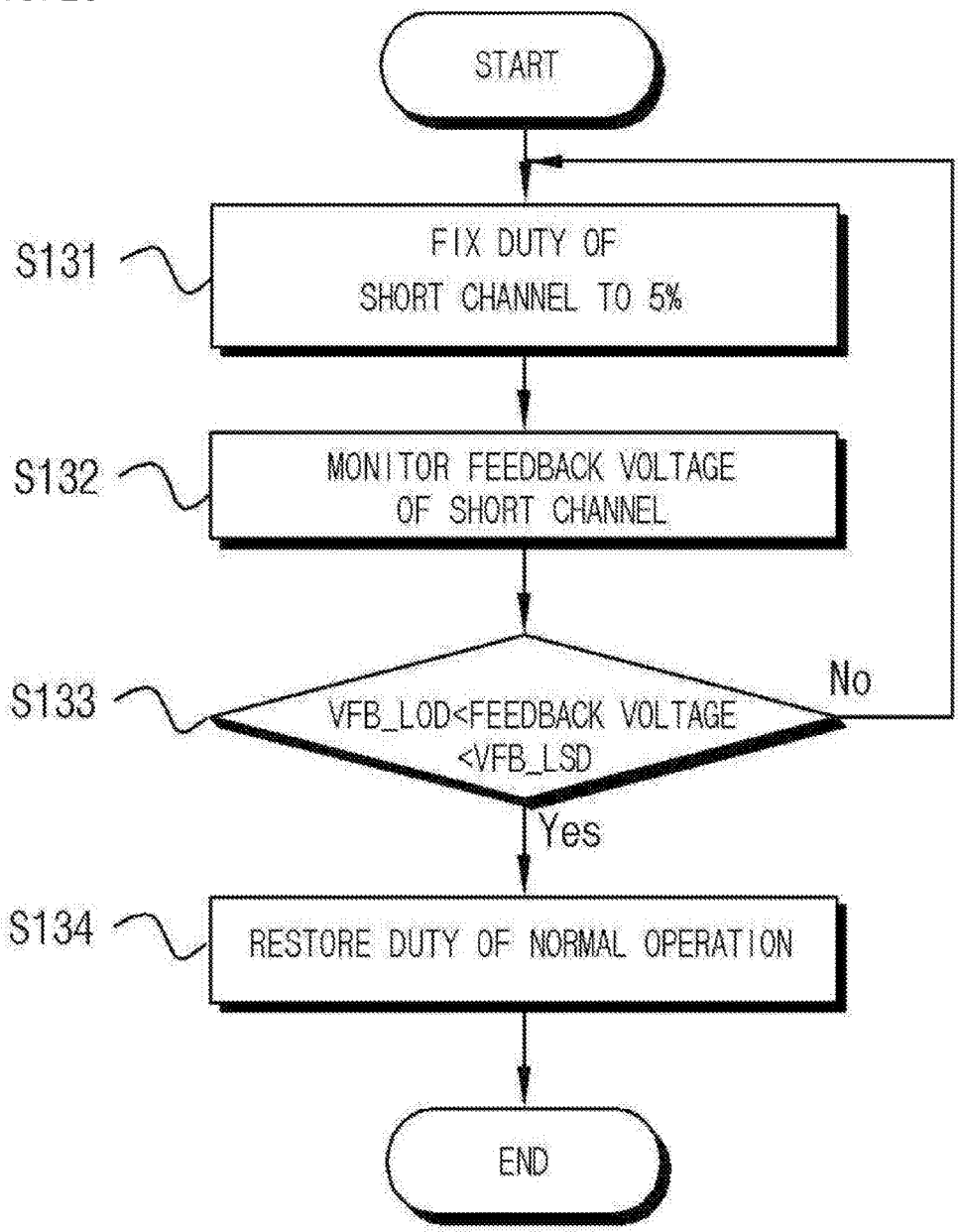

FIGS. 18 to 20 are representations of examples of flow charts to assist in the explanation of a method for monitoring a lamp control device in accordance with the fourth and fifth embodiments of the present disclosure. FIG. 19 is a flow chart for a channel protection mode corresponding to an open, and FIG. 20 is a flow chart for a channel protection mode corresponding to a short.

First, a method for monitoring an open of an LED channel will be described below.

Referring to FIG. 18, in the present embodiment, the controller 20 detects the feedback voltages FB1 to FB8 of the first to eighth channels CH1 to CH8 when the channel dimming signal FDIM is enabled (S1).

The controller 20 compares the detected feedback voltages FB1 to FB8 and a first reference voltage VFB_LOD set in advance (S2), and determines whether at least any one among the feedback voltages FB1 to FB8 is lower than the first reference voltage VFB_LOD (S3).

In FIG. 18, the first reference voltage VFB_LOD is a reference voltage for determining an open of a channel, and a second reference voltage VFB_LSD is a reference voltage for determining a short of a channel. The first reference voltage VFB_LOD may be set to be lower than the second reference voltage VFB_LSD. The first and second reference voltages VFB_LOD and VFB_LSD may be set in the memory of the controller 20 or an external memory.

The controller 20 monitors whether the over voltage protection signal DOVP is generated, if at least any one among the feedback voltages FB1 to FB8 is lower than the first reference voltage VFB_LOD (S4). When the over voltage protection signal DOVP is not generated, the controller 20 determines that a variation in the feedback voltages FB1 to FB8 is due to noise, and returns to the step S1 of detecting the feedback voltages FB1 to FB8.

If the over voltage protection signal DOVP is generated, the controller 20 determines whether the over voltage protection signal DOVP is detected by a first reference count set in advance (S5). If, as a result of the determination, the over voltage protection signal DOVP is detected by the first reference count, the controller 20 determines that a corresponding channel is open (S6). If the over voltage protection signal DOVP is not detected by the first reference count, the controller 20 returns to the step S1 of detecting the feedback voltages FB1 to FB8.

When it is determined that a channel is open (S6), the corresponding channel is driven in a channel protection mode (S7).

The operation of the channel protection mode corresponding to an open will be described below. For the sake of convenience in explanation, it is exemplified that the first channel CH1 is open.

Referring to FIG. 19, first, in order to prevent an efficiency from being degraded and a temperature from rising as the output voltage VOUT increases by the first channel CH1 which is open, the feedback voltage FB1 of the first channel CH1 is excluded from the regulation of the output voltage VOUT (S71).

The controller 20 continuously monitors the feedback voltage FB1 of the open first channel CH1 to automatically perform a normal operation when the LED of the first channel CH1 is repaired or replaced (S72). For instance, the feedback voltage FB1 may be monitored by being detected at the falling edge of the channel dimming signal FDIM.

The controller 20 determines whether the detected feedback voltage FB1 is normal (S73). For instance, the feedback voltage FB1 may be determined to be normal, when it is higher than the first reference voltage VFB_LOD and is lower than the second reference voltage VFB_LSD. As described above, the first reference voltage VFB_LOD is a voltage for determining an open of a channel, the second reference voltage VFB_LSD is a voltage for determining a short of a channel, and the first reference voltage VFB_LOD may be set to be lower than the second reference voltage VFB_LSD.

If the feedback voltage FB1 of the first channel CH1 determined as an open is detected to be normal, the controller 20 automatically returns the first channel CH1 to a normal operation (S74).

As a result, in the present embodiment, since configuration is made such that the feedback voltage FB1 of the first channel CH1 determined as an open is monitored, a normal operation may be automatically performed if the first channel CH1 is replaced or repaired.

Next, a method for monitoring a short of an LED channel will be described below.

Referring to FIG. 18, in the present embodiment, in the same manner as monitoring an open of an LED channel, the controller 20 detects the feedback voltages FB1 to FB8 of the first to eighth channels CH1 to CH8 when the channel dimming signal FDIM is enabled (S1).

The controller 20 compares the detected feedback voltages FB1 to FB8 and the first reference voltage VFB_LOD set in advance (S2), and determines whether the feedback voltages FB1 to FB8 are higher than the second reference voltage VFB_LSD, when the feedback voltages FB1 to FB8 are higher than the first reference voltage VFB_LOD (S3 and S8).

The controller 20 increases a count when at least any one among the feedback voltages FB1 to FB8 is higher than the second reference voltage VFB_LSD (S9), and initializes a count when the feedback voltages FB1 to FB8 are lower than the second reference voltage VFB_LSD (S10). As a result, in the present embodiment, the controller 20 increases a count only when the feedback voltages FB1 to FB8 are detected to be continuously higher than the second reference voltage VFB_LSD.

The controller 20 determines that a corresponding channel is shorted, when the state in which at least any one among the feedback voltages FB1 to FB8 is higher than the second reference voltage VFB_LSD is continuously retained for N number of clocks of the channel dimming signal FDIM (S11 and S12). For instance, the controller 20 may determine that a corresponding channel is shorted, when the state in which at least any one among the feedback voltages FB1 to FB8 is higher than the second reference voltage VFB_LSD is continuously retained for 100 clocks of the channel dimming signal FDIM (see FIG. 17).

When it is determined that a channel is a short (S12), the corresponding channel is driven in the channel protection mode (S13).

The operation of the channel protection mode corresponding to a short will be described below. For the sake of convenience in explanation, it is exemplified that the first channel CH1 is shorted.

Referring to FIG. 20, first, in order to prevent heat generation due to a short and prevent another channel from mis-operating by the shorted first channel CH1, the duty of the first channel CH1 is fixed to a level at which an LED does not emit light (S131). For example, in the present embodiment, the duty of the first channel CH1 may be fixed to 5%.

The controller 20 continuously monitors the feedback voltage FB1 of the shorted first channel CH1 to automatically perform a normal operation when the LED of the first channel CH1 is repaired or replaced (S132). The monitoring of the feedback voltage FB1 includes the process of detecting the feedback voltage FB1 at the falling edge of the channel dimming signal FDIM.

The controller 20 determines whether the detected feedback voltage FB1 is normal (S133). The feedback voltage FB1 may be determined to be normal, when it is higher than the first reference voltage VFB_LOD and is lower than the second reference voltage VFB_LSD.

If the feedback voltage FB1 is detected to be normal, the controller 20 restores the duty of a normal operation corresponding to the first channel CH1 (S134) (see FIG. 17).

As is apparent from the above descriptions, according to the embodiments, it is possible to precisely monitor an open or a short of a vehicle lamp which adopts LEDs. According to the embodiments, driving stability may be improved by excluding the feedback voltage of an LED channel determined as an open or a short, from regulation of an output voltage, or controlling a duty.

Meanwhile, according to the embodiments, if there is a channel in which an open or a short occurs, configuration may be made such that not only the corresponding channel but also all the other channels are open together so that a driver may perceive the malfunction of a lamp (RCL).

In addition, according to the embodiments, configuration may be made such that, by turning off only an open or shorted channel and normally operating the other channels, the basic operation of the lamp (RCL) may be performed by using normal LED channels even though a problem is caused in a certain channel.

As a consequence, according to the embodiments, the mis-operation of a vehicle lamp which adopts LEDs may be precisely monitored, and a protection operation may be performed for an LED channel which mis-operates, whereby occurrence of a vehicle accident may be prevented and driving stability may be improved.

While various embodiments have been described above, it will be understood to those skilled in the art that the embodiments described are by way of example only. Accordingly, the disclosure described herein should not be limited based on the described embodiments.

What is claimed is:

1. A lamp control device comprising:
   a lamp including an LED module which has a plurality of LED channels; and
   a controller configured to detect respective feedback voltages of the plurality of LED channels, determine when at least any one feedback voltage among the feedback voltages is retained to be lower than a predetermined reference voltage and a generation count of an over voltage protection signal reaches a predetermined reference count, an LED channel corresponding to the feedback voltage, as an open, and drive the LED channel determined as the open under a channel protection mode,
   wherein, when the channel protection mode is driven, the controller excludes the feedback voltage corresponding to the LED channel determined as the open from regulation of an output voltage, monitors the feedback voltage of the LED channel determined as the open, and returns the LED channel to a normal operation when the feedback voltage is detected to be normal.

2. The lamp control device of claim 1,
   wherein the controller includes a monitoring unit and a monitoring control unit which are configured for each of the plurality of LED channels,
   wherein the monitoring unit detects the feedback voltage of a corresponding LED channel in correspondence to a channel dimming signal, and outputs a detection signal corresponding to the feedback voltage, and
   wherein the monitoring control unit enables and outputs a channel detection signal when a generation count of the over voltage protection signal reaches the reference count, in correspondence to the detection signal.

3. The lamp control device of claim 2, wherein the monitoring unit comprises:
   a switch configured to transfer the feedback voltage in correspondence to the channel dimming signal; and
   a comparing section configured to compare the feedback voltage and the reference voltage, and enable and output the detection signal when the feedback voltage is lower than the reference voltage.

4. The lamp control device of claim 3, wherein the monitoring control unit comprises:
   an open determining section configured to check whether the over voltage protection signal is generated, when the detection signal is in an enabled state in correspondence to a predetermined edge of the channel dimming signal, and enable and output an open determination signal when a generation count of the over voltage protection signal reaches the reference count; and a mode converting section configured to enable and output the channel protection signal in correspondence to the open determination signal.

5. A method for monitoring a lamp control device, comprising:

detecting respective feedback voltages of a plurality of LED channels;

checking whether an over voltage protection signal is generated, when at least any one feedback voltage among the feedback voltages is lower than a predetermined reference voltage;

determining an LED channel corresponding to the feedback voltage, as an open, when a generation count of the over voltage protection signal reaches a predetermined reference count; and driving the LED channel determined as the oven under a channel protection mode, wherein driving the channel protection mode comprises:

excluding the feedback voltage of the LED channel determined as the open, from regulation of an output voltage;

monitoring the feedback voltage of the LED channel determined as the open; and returning the LED channel to a normal operation when the feedback voltage is detected to be normal.

6. A lamp control device comprising:

a lamp including an LED module which has a plurality of LED channels; and a controller configured to detect respective feedback voltages of the plurality of LED channels, determine, when at least any one feedback voltage among the feedback voltages is retained to be higher than a predetermined reference voltage and is continuously retained for a predetermined time, an LED channel corresponding to the feedback voltage, as a short, and drive the LED channel determined as the short under a channel protection mode, wherein when the channel protection mode is driven, the controller fixes a duty of the LED channel determined as the short to a value of a level at which an LED does not emit light, monitors the feedback voltage of the LED channel determined as the short and restores the duty of the LED channel to a normal operation when the feedback voltage is detected to be normal.

7. The lamp control device of claim 6, wherein the controller comprises:

a switch configured to transfer the feedback voltage in correspondence to a channel dimming signal;

a comparing section configured to compare the feedback voltage and the reference voltage, and enable and output a detection signal when the feedback voltage is higher than the reference voltage;

a short determining section configured to enable and output a short determination signal when the detection signal is continuously retained in an enabled state in correspondence to a predetermined edge of the channel dimming signal for N number of clocks of the channel dimming signal; and a mode converting section configured to enable and output a channel protection signal in correspondence to the short determination signal, and wherein the switch, the comparing section, the short determining section and the mode converting section are configured for each of the plurality of LED channels.

8. A method for monitoring a lamp control device, comprising:

detecting respective feedback voltages of a plurality of LED channels;

increasing a count when at least any one feedback voltage among the feedback voltages is higher than a predetermined reference voltage;

determining an LED channel corresponding to the feedback voltage, as a short, when the count reaches a predetermined reference count; and driving the LED channel determined as the short under a channel protection mode, wherein driving the channel protection mode comprises:

fixing a duty of the LED channel determined as the short to a value of a level at which an LED does not emit light;

monitoring the feedback voltage of the LED channel determined as the short; and restoring the duty of the LED channel to a normal operation when the feedback voltage is detected to be normal.

9. The method of claim 8, wherein the increasing of the count further comprises:

initializing the count when the feedback voltage is lower than the reference voltage.

* * * * *